United States Patent
Lee

(10) Patent No.: US 6,335,930 B1
(45) Date of Patent: Jan. 1, 2002

(54) MULTI-STAGE INTERCONNECTION NETWORK FOR HIGH SPEED PACKET SWITCHING

(75) Inventor: Hee-choul Lee, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/085,248

(22) Filed: May 26, 1998

(30) Foreign Application Priority Data

May 23, 1997 (KR) .......................................... 97-20225

(51) Int. Cl.[7] .......................... H04L 12/50; H04L 12/28
(52) U.S. Cl. ........................................ 370/387; 370/389
(58) Field of Search .................................. 370/387, 388, 370/389, 392, 394, 411; 340/2.21, 2.23, 2.27; 379/221, 273

(56) References Cited

U.S. PATENT DOCUMENTS

| | | | | |
|---|---|---|---|---|
| 4,837,855 A | * | 6/1989 | Hajikano et al. | 359/117 |
| 4,907,220 A | * | 3/1990 | Rau et al. | 370/399 |
| 5,337,308 A | * | 8/1994 | Fan | 370/388 |
| 5,367,520 A | * | 11/1994 | Cordell | 370/395 |
| 5,451,936 A | * | 9/1995 | Yang et al. | 340/826 |
| 5,471,460 A | * | 11/1995 | Tanabe | 370/218 |
| 5,666,360 A | * | 9/1997 | Chen et al. | 370/390 |
| 6,125,112 A | * | 9/2000 | Koning et al. | 370/388 |

OTHER PUBLICATIONS

Peter Newman "ATM Technology for Corporate Networks", Apr. 1992, pp. 90–101, IEEE Communications Magazine.

Satoshi Nojima et al., Integrated Services Packet Network Using Bus Matrix Switch, 1997, pp. 1284–1292, IEEE Journal on Selected Areas in Communication Magazine.

Alan Huang et al., "Starlite: A Wideband Digital Switch", Nov. 1984, pp. 121–125, GlOBECOM.

Fouad A. Tobagi et al., "Architecture, Performance and Implementation of the Tandem Banyan Fast Packet Switch", Oct. 1991, pp. 1173–1193, IEEE Journal on Selected Areas in Communications Magazine.

Y.C. Jung et al., "Analysis of Out–of–sequence problem and preventative schemes in parallel switch architecture for high–speed ATM network", Feb. 1994, pp. 29–38, IEEE–Proceeding–Communications.

Manoj Kumar et al., "Performance of Unbuffered Shuffle–exchange Networks", Jun. 1986, pp. 573–577, IEEE Transactions on Computers.

(List continued on next page.)

Primary Examiner—Wellington Chin
Assistant Examiner—Brenda H. Pham
(74) Attorney, Agent, or Firm—Marger Johnson & McCollom, P.C.

(57) ABSTRACT

Disclosed is a multi-stage (NXN) interconnection network which has N input ports and N output ports, for transmitting packets from the input ports to the output ports. The network comprises a multi-stage packet switching network having at least $\log_M N$ switching stages; and each of the switching stages having N/2 MXM switching elements, where M is the number of input or output ports of each switching element. Each switching element at each stage comprises X bypassing input ports, M–X input routing ports, X bypassing output ports and M–X output routing ports, where X is 1 or integer of more than 1. The bypassing output ports of each switching element at each stage are connected to bypassing input ports of each of switching elements which are disposed in a same position of a next stage, respectively, and the output routing ports of each switching element at each stage are connected to input routing ports of each of the switching elements at the next stage by means of perfect shuffle connection.

21 Claims, 28 Drawing Sheets

OTHER PUBLICATIONS

Tony T. Lee et al., "Broadband Packet Switches Based on Dilated Interconnection Networks", 1994, pp. 732–744, IEEE Transactions on Communications.

Tony T. Lee, "A Modular Architecture for Very Large Packet Switches", Jul. 1990, pp. 1097–1106, IEEE Transactions on Communications.

Duncan H. Lawrie, "Access and Alignment of Data in an Array Processor", Dec. 1975, pp. 1145–1155, IEEE Transactions on Computers.

Solomon W. Golomb, "Premutation by Cutting and Shuffling", Oct. 1961, pp. 293–298, SIAM Review.

Chuan–Lin Wu et al., "On a Class Multistage Interconnection Networks", Aug. 1980, pp. 694–702, IEEE Transactions on Computers.

Marshall C. Pease, III, "The Indirect Binary n–Cube Microprocessor Array", May 1977, pp. 458–473, IEEE Transactions on Computers.

Ronald J. Vetter, "ATM Concepts, Acitectures and Protocols", Feb. 1995, pp. 30–38, Communications of the ACM.

Janak H Patel, "Performance of Processor–Memory Interconnections for Multiprocessor", Oct. 1981, pp. 771–780, IEEE Transactions on Computers.

Tomas Lang et al., "Nonuniform traffic Spots (Nuts) in Multistage Interconnection Networks", 1990, pp. 55–57, Journal of Parallel and Distributed Computing.

Yu–Shuan Yeh et al., "The Knockout Switch: A Simple, Modular Architecture for High–Performance Packet Switching", pp. 1274–1283, IEEE Journal on Selected Areas in Communications.

H.C. Lee et al., Electronic Letters, Dec. 5, 1996, vol. 32 No. 25, Bypassing Omega Network for High Speed Packet Switching, pp. 2301–2302.

\* cited by examiner

Functional Logic Division
For Single Chip

MULTI-STAGE INTERCONNECTION NETWORK FOR HIGH SPEED PACKET SWITCHING

FIELD OF THE INVENTION

The present invention relates to a packet switching network, and more particularly a multi-stage interconnection network having several switching stages.

BACKGROUND OF THE INVENTION

High speed packet switching is a key technology for Broad-band Integrated Services Digital Network (B-ISDN). Currently, Asynchronous Transfer Mode (ATM) is receiving tremendous attention for the next generation of communication technology. The ATM was defined by the CCITT (currently ITU-T) which is the United Nations (U.N) body which defines future telecommunication standards. The basic Protocol Data Unit (PDU) of ATM, which is called a cell, has a fixed length of 53 bytes. ATM switching can be classified as part of the larger category packet switching.

The high speed packet switch is a key technology for B-ISDN technology. There are many requirements for the architecture of a high speed packet switch, such as a modularity and high fault-tolerance, which contribute to easy implementation and good quality of service. Such technology is disclosed in "ATM Technology for Corporate Networks", IEEE Communications Magazine, pages 90–101, April, 1992.

A packet switch is a system that is connected to multiple transmission links and does the central processing for the activity of a packet switching network where the network consists of switches, transmission links and terminals. The transmission links are connected to network equipment, such as multiplexers (MUX) and demultiplexers (DMUX). A terminal can be connected to the MUX/DMUX or it can be connected to the packet switch system. Generally, the packet switch consists of input and output transmission link controllers and the switching network. The input and output link controllers perform the protocol termination traffic management and system administration related to transmission jobs and packet transmission. These controllers also process the packets to help assist in the control of the internal switching of the switching network.

The switching network of the packet switch performs space-division switching which switches each packet from its source link to its destination link. There are many known architectures for switching networks. The important characteristics for a switching network are self-routing for high speed switching, short transmission delays, low delay variance, good fault tolerance for high quality service, and high reliability for easy maintenance. Generally, the switching networks are composed of several switching stages with a web of interconnections between adjacent stages. These network are called Multi-stage Interconnection Networks (MIN). Each stage consists of several basic switching elements where the switching elements perform the switching operation on individual packets for self-routing of the packets.

Self-routing enables each packet to be processed by the distributed switching elements without a central control scheme, and thus high speed switching can be done.

The architecture of packet switching networks can be classified by the buffering scheme employed in the network for various queues. For example, input queuing, output queuing, input/output queuing, crosspoint queuing, central queuing, internal queuing and the like.

Input queuing suffers from what is called the "head of line" problem (e.g., head of line:HOL). The head of line problem occurs when a packet at the head of line, or first-in position, in a first-in-first-out (FIFO) input buffer is blocked by an output collision with another packet in the network. While the HOL packet is blocked, the other packets in the FIFO buffer are also blocked as they await their turn for the head of line position in the FIFO input buffer while their output destinations are not occupied by other routing requests.

Output queuing is better than input queuing because it does not suffer from the HOL problem, but the buffer size for each output port must be increased as the number of input ports increases. Internal queuing and crosspoint queuing also increase the hardware complexities as the number of ports increases. Central queuing has a bottleneck caused by the speed of memory accesses within the central queue which increases with the number of ports.

Switching networks can also be classified as time division switches in addition to space division. There are many proposed architectures for each division method, as disclosed in "ATM Technology for Corporate Networks", IEEE Communications Magazine, pages 90–101, April, 1992.

The time division switching technique is not adequate for large scale switching systems. Under the space division switching technique, a single path network has some problems such as low maximum throughput and hardware complexity. However, the matrix for the time division technique combined with the fully interconnected architecture of space division technique has good performance and can be adapted to the design of the basic elements, as disclosed in "Integrated Services Packet Network Using Bus Matrix Switch", IEEE Journal on Selected Areas in Communications Magazine, 22(4): 24–31, April, 1994.

Among multiple path switching networks, a recirculating scheme causes an increase in the number of inlets due to the recirculated lines, so that it is not adequate for a large scale switching system. This technology is disclosed in "STAR-LITE: A Wideband Digital Switch", GLOBECOM, pages 121–125, November 1984.

On the other hand, tandem banyan networks (discussed in "Architecture, Performance, and Implementation of the Tandem Banyan Fast Packet Switch", IEEE Journal on Selected Areas in Communications, 9(8):1173–1193, October 1991; U.S. Pat. No. 5,541,914), parallel banyan networks (discussed in "Analysis of Out-of-Sequence Problem and Preventative Schemes in Parallel Switch Architecture for High-speed ATM Network", IEEE-Proceeding-Communications, 141(1):29–38, February 1994), load sharing networks (discussed in "Performance of Unbuffered Shuffle-exchange Networks", IEEE Transactions on Computers, c-35(6): 573–577, June 1986), dilated networks (discussed in "Broadband Packet Switches Based on Dieted Interconnection Network", IEEE Transactions on Communications, 42(2.3.4): 732–744, 1994) and close networks (discussed in "A Modular Architecture for Very Large Packet Switches", IEEE Transactions on Communications, 38(7): 1097–1106, 1990) are each good candidates for the architecture of a large scale ATM switching system.

In multiple path switching networks, the number of paths from a given input port to a given output port can be one measure of the performance. A banyan network is a network which has one and only one path from each input port to each output port. A tandem banyan network serially connects each banyan network so that multiple routing trials can be taken. A parallel banyan network is one in which several networks are connected in parallel with one another. A rerouting network is one in which respective banyan networks are overlapped, so that a packet which has failed in one routing trial can restart its routing path at the next stage of the network. Among the different types of networks, the rerouting network has the largest number of routing paths for a given level of hardware complexity.

Lawrie has reported on an omega network for data access and alignment using an array processor in order to access multiple data at the same time in "Access and Alignment of Data in an Array Processor", IEEE Transactions on Computers, C-24(12):1145–1155, December 1975. The omega network consists of n switching stages (where n=$\log_s$N stages with N being the number of input ports and the number of input ports, i.e. the number of input and output ports being the same is a "square size" network). Each of the n switching stages is composed of N/2 basic switching elements and each switching element performs 2×2 switching.

FIG. 1 shows an embodiment of an omega network having a two port perfect shuffle interconnection scheme. The omega network supports bi-directional routing and the number of perfect shuffle connections is the same as the number of switching stages. But one perfect connection can be omitted if support for single-directional routing can be omitted. Perfect shuffling of N wires is obtained by separating the bottom N/2 wires from the top N/2 wires and precisely interleaving the two blocks with the bottom wires remaining on the bottom, as disclosed in "Permutation By Cutting and Shuffling", SIAM Review, 3(4):293–298, October 1961.

The perfect shuffle connection can also be explained as follows: if we number the switching elements from top to bottom with binary number, such as ($b_{n-1}b_{n-2}, \ldots b_1$), then the upper output port is connected to the next switching stage element with the next highest number ($b_{n-2}b_{n-3} \ldots b_1 0$) and the lower output port is connected to the next lower switching stage element ($b_{n-2}b_{n-3} \ldots b_1 1$), as discussed in "On a Numbered Class of Multistage Interconnection Networks", IEEE Transaction on Computers, C-29(8): 694–702, August 1980. For example, the switching element "10" of the second stage STG102 in FIG. 1 is connected with the switching element "00" in third stage STG103 through the upper output port connection and with the switching element "01" in the third stage STG103 through the lower output connection. The omega network is also known to be topologically equivalent to a baseline network, flip network, modified data manipulator (discussed in "Architecture, Performance, and Implementation of the Tandem Banyan Fast Switch", IEEE Journal on Selected Area in Communication, 9(8):1173–1193, October 1991), indirect binary n-cube network (discussed in "The Indirect Binary Ncube Microprocessor Array", IEEE Transaction on Computers, C26(5):458–473, May 1977), and regular SW banyan network (discussed in "On a Class of Multistage Interconnection Networks", IEEE Transaction on Computers, C-29(8):694–702, August 1980). The omega network is also a banyan network because it has a unique path from each input port to each output port.

The omega network is self-routing, as is shown in the packet routing example of FIG. 2. The example packet, with a destination address value of "001", starts from the source port,"011", and sequentially passes switching elements"01", "10" and "00" of stages STG201, STG202 and STG203, respectively, arriving at its destination port "001". The routing tag of the packet is the destination address where the most significant bit is used for routing at the first stage and the least significant bit is used for routing at the last stage. Note that the relative distance from each intermediate routing switching element to the destination port does not necessarily monotonically decrease with the number of switching stages traversed by the packet. This characteristic is in contrast to the modified data manipulator where each packet monotonically approaches the destination port in terms of physical distance.

For example, the example packet in FIG. 2 is one row apart from the corresponding switching element of the destination port at first stage STG201, but the packet diverges further away from the destination port at second stage STG202. But the example packet does make its way towards the destination port at each stage. The distance traveled by the packet is not so much the physical distance to the destination but manifests itself as the length of the connection wires through which the packet passes. The number of interconnection wires is numbered from top to bottom as ($b_{n-1}, b_{n-2}, \ldots b_0$). The approach can be observed by connection wires of the routing path, 01$\underline{0}$→1$\underline{00}$→$\underline{001}$, as shown in FIG. 2. The number of underlined bits increases as the number of stages traversed increases and the address of the interconnection wire eventually becomes the same as the destination address when the example packet has passed through all n routing stages.

With rapid growth in semiconductor processing technology, almost all electronic systems use VLSI (Very Large Scale Integrated) chips. The reasons for VLSI are rapid response speed, low cost, small space usage and feasibility. The size of a packet switch for the public network is very large, as discussed in "ATM Concepts, Architecture, and Protocols", Communications of the ACM, 38(2):30–38, 109, February 1995.

To implement a large scale system, the use of VLSI is inevitable and sufficient care should therefore be taken to design a network architecture that is amenable to VLSI implementation. At an early stage of the design process for a network architecture, the designer should consider which basic VLSI chips will constitute the network so that the logic can be easily partitioned for each VLSI chip. In other words, a good architecture that is adequate for VLSI is necessary.

The requirements of a good architecture for VLSI is low hardware complexity and modularity of the architecture for easy functional partitioning for a chip. The number of different types of chips should be minimized for low cost and easy maintenance. In terms of system implementation, the number of chips and the number of different types of chips greatly affects the system cost. The number of chips is highly dependent on the total hardware complexity of the switch architecture and the number of chip types is dependent on the modularity of the architecture.

With the development of VLSI technology, the amount of functional logic that can be partitioned into a single chip is now limited by the interface pin count of the functional block rather than the number of logic gates within the functional block. The number of logic gates that can be placed on a single chip has greatly increased due to the rapid evolution in processing technology, but the pin count for a chip is still mechanically limited. There is technology, such as multi-chip module (MCM) or wafer scale integration (WSI), which makes the complex connections inside a module or on a wafer. But the total pin count in these technologies still does not typically exceed 500. For example, the well known Pentium Pro microprocessor produced by Intel Corporation is an MCM device that has about 5.5 million transistors but has an interface pin count of 387.

A switching network, however, is a difficult architecture to implement using chips because it has so many interconnection wires that the number of interface pins that are required when it is partitioned into chips becomes unmanageable. Nevertheless, it is extremely important for the switching network to have the high performance of VLSI devices in order to obtain high speed switching.

FIG. 3 demonstrates the difficulty in functionally partitioning a switching network for implementation on using a single type of chip. When a functional partition is made for any one of subsystems M1, M2, or M3, the resulting 8×8 switch cannot be made using a single type of chip because the associated interconnection scheme between switch elements inside the chip is fixed and cannot be changed once the chip is fabricated to accommodate a particular specialized design not previously considered.

When subsystem M4 is selected for the functional partition, then only one type of chip is sufficient to implement the 8×8 switch because the interconnection wires among switching elements are external to the chip and can be changed to accommodate the specialized design. Even though the modularity in FIG. 3 was explained as if the modularity can be obtained simply through the selection of a functional partitioning method, in reality, the modularity of the network design is highly dependent on the interconnection scheme of the multi-stage interconnection network.

Good fault tolerance is also very important for any system but it is essential for large scale packet switches because they are typically used as part of the public switching network. Modular architecture is important for good fault tolerance as well as easy functional partitioning. FIG. 4 illustrates the inefficiency of fault recovery in a modified data manipulator. If there is a faulty element in the system, as shown by the shaded switch element in FIG. 4, then the faulty element should be removed from the system to prevent system performance degradation and maintain high quality service. If the element is not replaceable because it is integrated into a chip, then the entire chip module, which is the basic modular block in the system, must be replaced. If a banyan network is the smallest modular block then the banyan network chip with the faulty element must be replaced. However, the faulty element replacement must be performed on-line without a system shutdown in order to maintain continuous service to users of the network. To replace a chip module, a manual operation is required along with a system shutdown in order to protect the new module from a power shock and to maximize the system stability.

SUMMARY OF THE INVENTION

It is, therefore, an object of the present invention to provide a multistage interconnection network having a high degree of integration.

It is another object of the present invention to provide a multi-stage interconnection network having a highly fault-tolerant architecture.

It is a further object of the present invention to provide a packet switch system having modular characteristics, so that functional division for a single chip design can be easily achieved.

It is an additional object of the present invention to provide a packet-switched self-routing multistage interconnection network having a low packet loss rate. According to one embodiment of the present invention, a multi-stage (NXN) interconnection network having N input ports and N output ports, for transmitting packets from the input ports to the output ports, comprises a multi-stage packet switching network having at least $\log_M N$ switching stages, each of the switching stages having N/2 MXM switching elements where M is the number of input or output ports of each switching element. Each switching element of each stage comprises X bypassing input ports, M−X input routing ports, X bypassing output ports and M−X output routing ports, where X is an integer greater than 0. The bypassing output port of each switching element is connected to the bypassing input ports of a corresponding switching element in a next stage, respectively, and the output routing ports of each switching element at each stage are connected to the input routing ports of each of the switching elements of the next stage by means of a perfect shuffle connection scheme.

According to another embodiment of the present invention, a packet switch system includes an input module for receiving an original packet from a terminal and converting the original packet into a switching packet by adding an information field related to routing to the original packet, a multi-stage packet switching network for performing the routing of the switching packet, said network having at least $\log_M N$ switching stages. Each switching stage has N/2 (MXM) switching elements, where M is the number of input or output ports of each switching element. Logic circuitry generates a minimal routing number related to each switching stage and supplies the minimal routing number to the switching elements of each stage. An output module receives the switching packet from the multi-stage packet switching network and converts the switching packet into the original packet by removing the information field from the switching packet. Each switching element at each stage comprises X bypassing input ports, M−X input routing ports, X bypassing output ports and M−X output routing ports, where X is an integer greater than 0. The bypassing output ports of each switching element at each stage are connected to the bypassing input ports of each of the switching elements which are disposed in a corresponding position of a next stage. The output routing ports of each switching element at each stage are connected to input routing ports of the switching elements at the next stage by means of a perfect shuffle connection scheme. The input routing ports of each switching element at a first stage are connected to the input module.

An embodiment of a method, according to the present invention, for switching packets in a NXN multi-stage inter-connection network, involves providing a plurality of MXM switching elements, where each switching element has M routing input ports, M routing output ports, a bypass input port and a bypass output port and organizing the plurality of MXM switching elements into $\log_M N$ stages. The method then involves connecting each of the routing input ports of the switching elements in a first stage of the $\log_M N$ stages to one of the N input ports of the NXN network and connecting each of the routing output ports of the switching elements in a last stage of the $\log_M N$ stages to one of the N input ports of the NXN network. Finally, the method calls for interconnecting the $\log_M N$ stages through a perfect shuffle interconnection scheme of the routing input ports and routing output ports of the switching elements in adjacent stages, and interconnecting the bypass output port of each switching element to the bypass input port of a corresponding switching element in the adjacent stage.

BRIEF DESCRIPTION OF THE DRAWINGS

This invention may be understood and its objects will become apparent to those skilled in the art by reference to the accompanying drawings as follows.

DETAILED DESCRIPTION OF PREFERRED EMBODIMENTS

Figure 1:
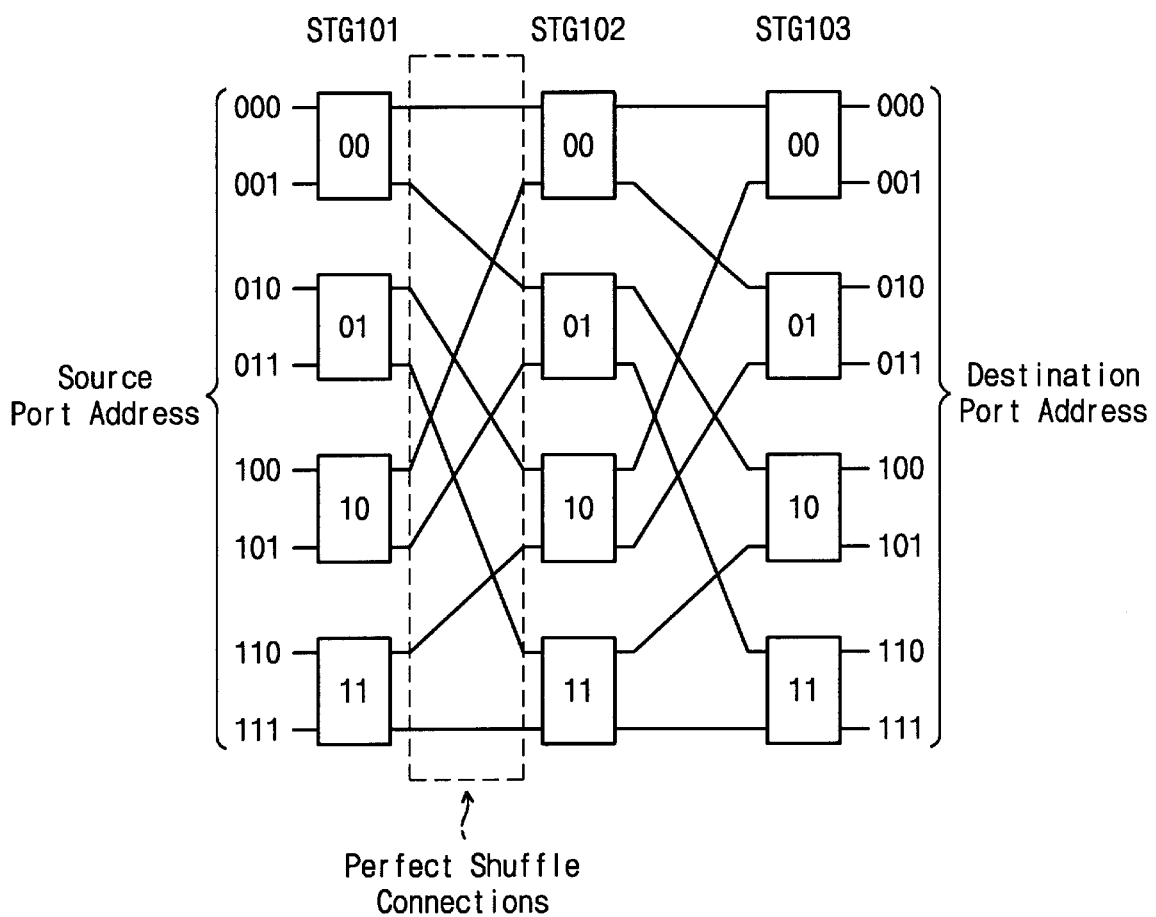
FIG. 1 is a block diagram showing a conventional omega network where two perfect shuffle connections occur.
Figure 2:
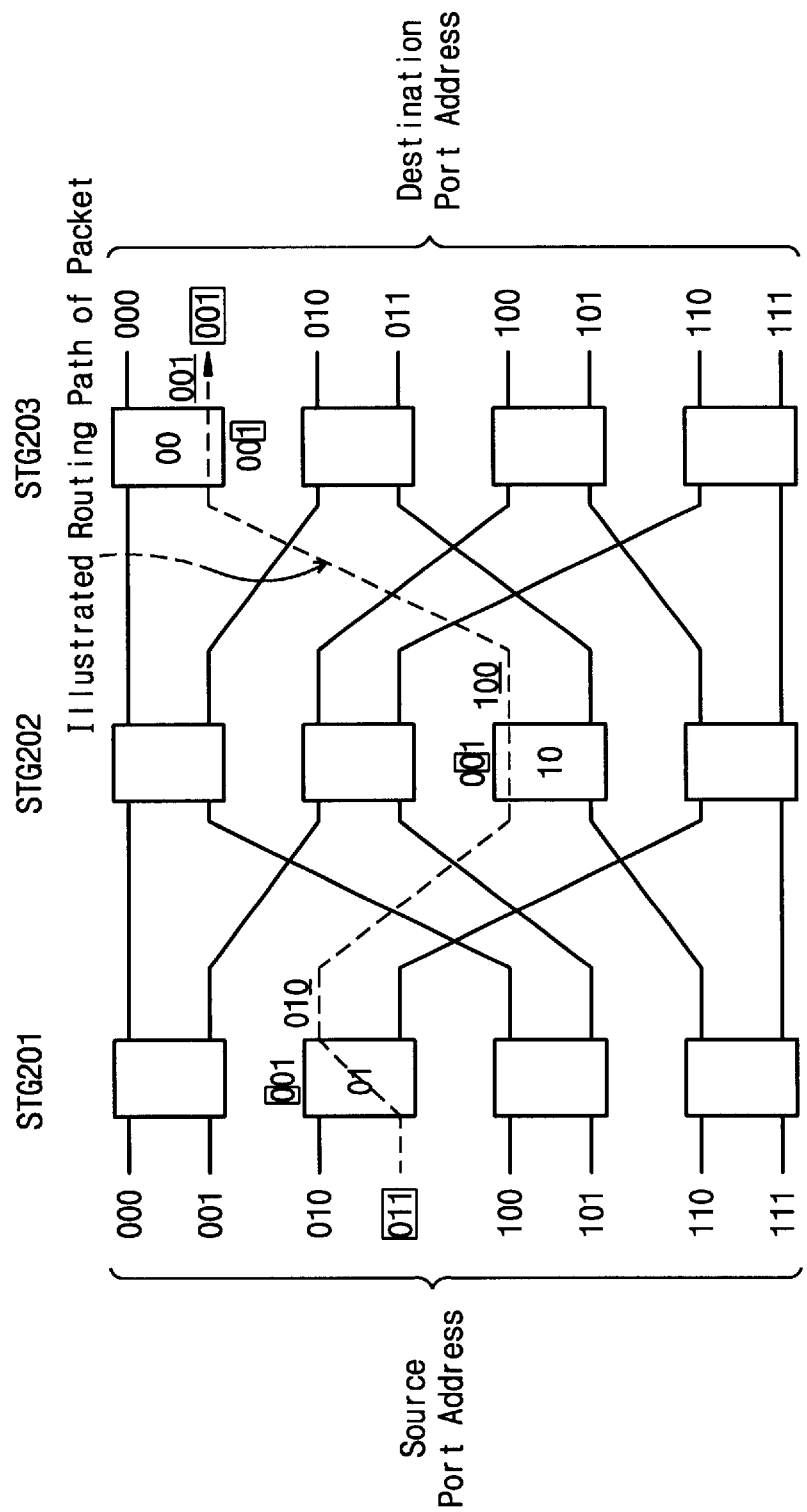
FIG. 2 is a block diagram illustrating the self-routing characteristic of the conventional omega network shown in FIG. 1.
Figure 3:
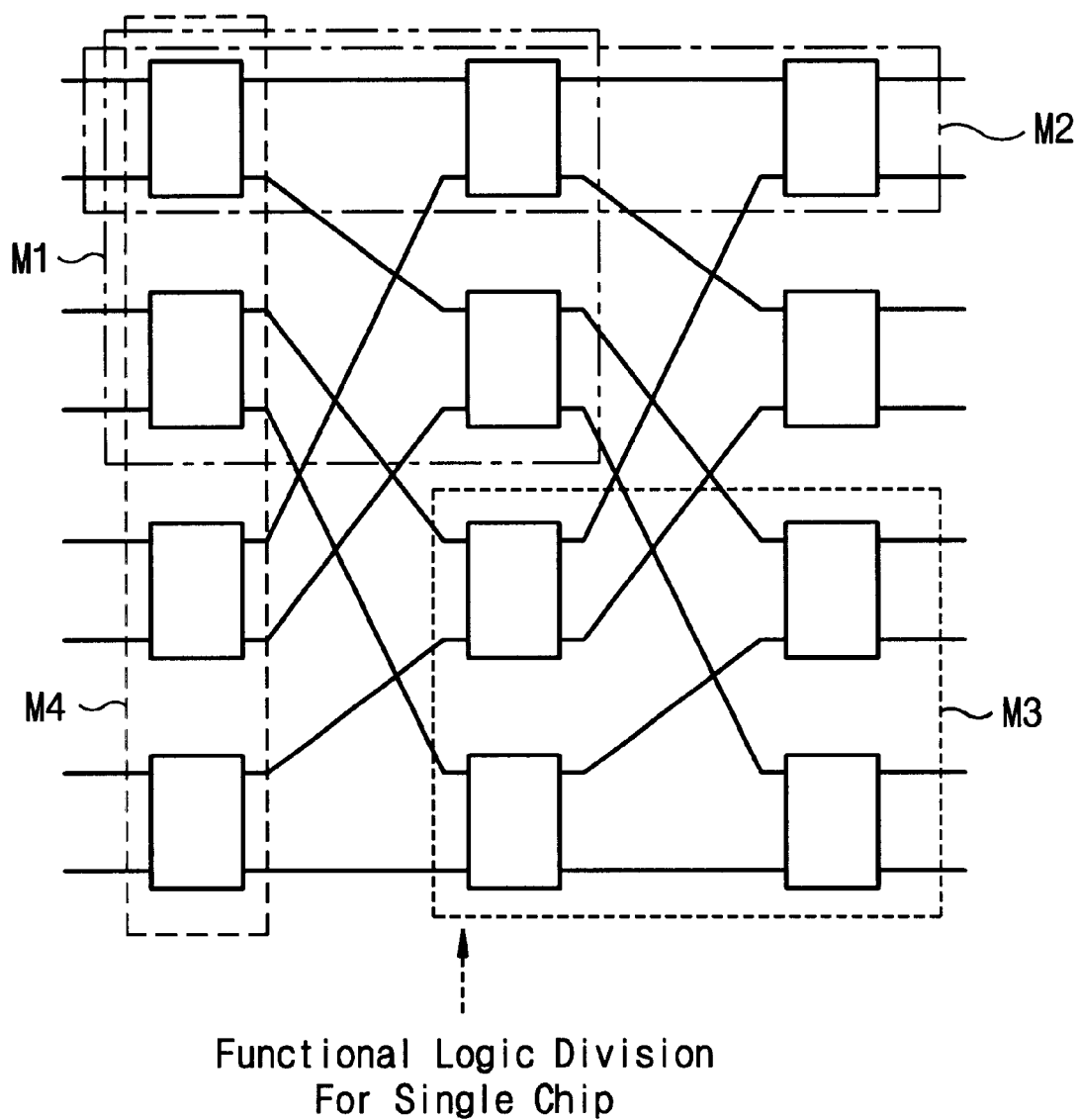
FIG. 3 is a diagram illustrating the importance of system modularity in reducing the number of different chip types in the implementation of this network.
Figure 4:
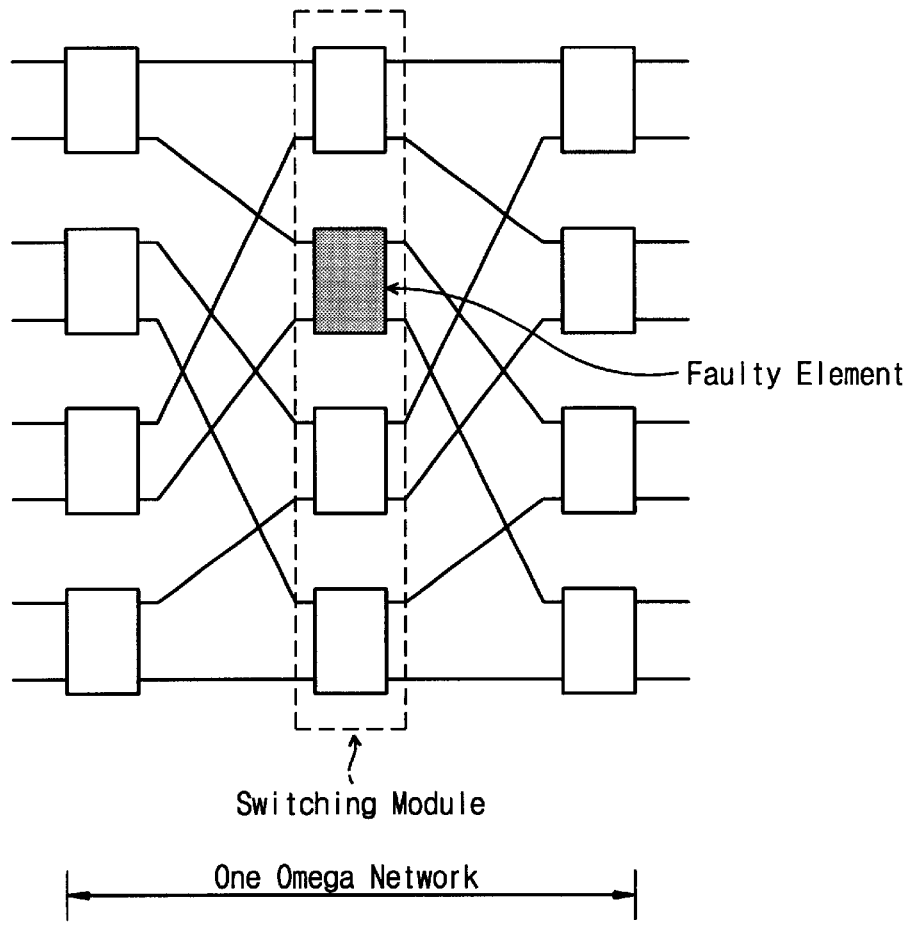
FIG. 4 is a diagram illustrating the importance of system modularity FIG. 1 with regard to fault tolerance in the omega network of FIG. 1.
Figure 5:
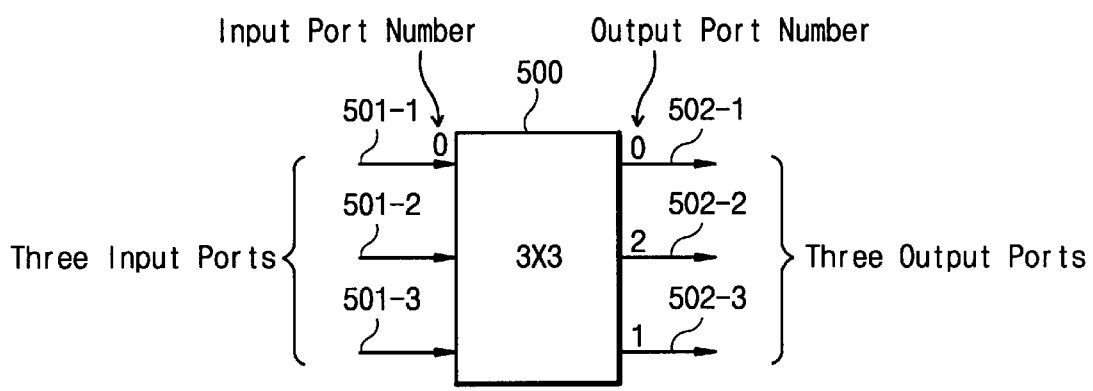
FIG. 5 illustrates an example of the MXM basic switching element which is used in a bypassing omega network or a spread omega network according to the present invention.

FIG. 5 shows an example of an MXM basic switching element which is used in a bypassing omega network (BON) or a spread omega network according to the present invention. In the example of FIG. 5, M is 3. The switching element 500 has, as shown in FIG. 5, three input ports 501-1, 501-2 and 501-3, and three output ports 502-1, 502-2 and 502-3. The output ports 502-1, 502-2 and 502-3 are also labeled with the numerals '0', '1' and '2'. The two output ports which are labeled '0' and '1', namely the routing ports 502-1 and 502-3, are connected in a perfect shuffle configuration to the next stage. The other output port, which is labelled '2' and is the bypassing port 502-2, is connected to the bypassing port of the switching element in the corresponding position of the next stage.

Figure 6:
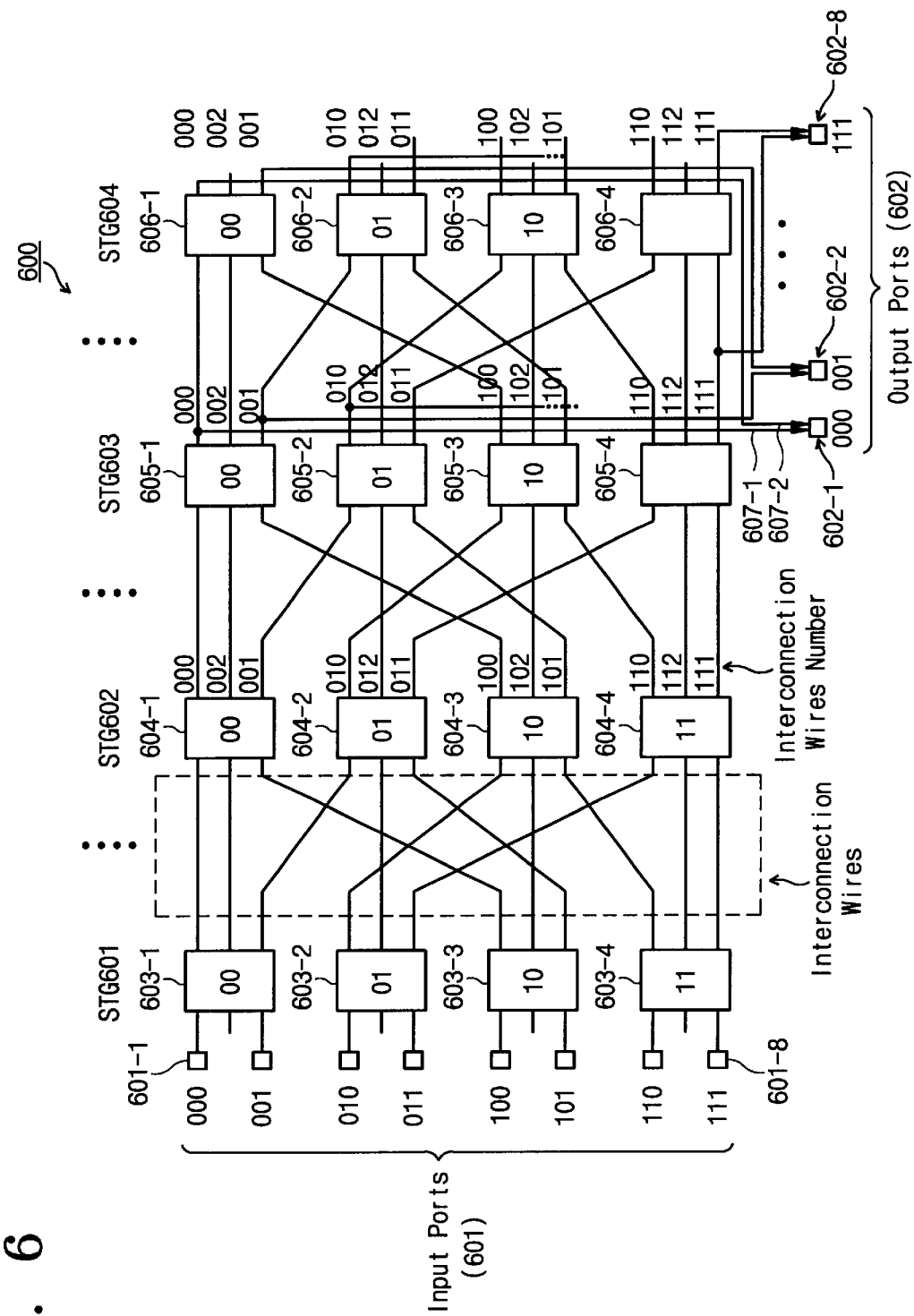
FIG. 6 illustrates an example of the NXN bypassing omega network which consists of $S_{total}$ switching stages.

FIG. 6 shows an example of an NXN bypassing omega network (BON) 600 which consists of $S_{total}$ switching stages. In the bypassing omega network 600 of FIG. 6, $S_{total}$ is 4 and N is 8. Bypassing omega network 600 has four switching stages STG601–STG604, eight input ports 601-1, 601-2, ..., 601-8 and eight output ports 602-1, 602-2, ..., 602-8. Each switching stage is constructed with N/2 switching elements (N=8)÷2 or four MXM switching elements in the network 600. Each switching element performs 3×3 switching.

In network 600, $S_{total}$ should be greater than n=log$_2$N, where N is the number of input ports. The interconnection pattern between stages consists of both perfect shuffle and horizontal connections. The perfect shuffle is the same connection scheme or pattern used in the prior art explained above. The center output port of each switching port, however, also has a horizontal connection to the switching elements in the corresponding position of next stage.

To explain the connection among switching elements, the switching elements are labeled from top to bottom with binary number as $(b_{n-1}b_{n-2} \ldots b_1)$ in FIG. 6. For example, at second stage STG602, the first position switching element 604-1 is labeled with "00", and the last position switching element 604-4 is labeled with "11". And the output ports of each switching element are numbered with '0', '1' and '2', as shown previously in FIG. 5. Each of the interconnection wires between adjacent switching elements in stages STG602 and STG603 is also numbered with $(b_{n-1}b_{n-2} \ldots$ $b_1 t$), where ($b_{n-1} b_{n-2} \ldots b_1$) is the switching element label in the preceding stage and t is the output port number on the switching element. The switching element number, ($b_{n-1} b_{n-2} \ldots b_1$) is a binary number and the output port number, t, is a radix 3, ternary number. The number of the next stage switching element to which an output port, t, at a switching element, SE, will be connected is defined as $NSW^{(t)}(SE)$. The connection of each switching element in the bypassing omega network 600 can therefore be represented by the following equations:

$$NSW^{(0)}(b_{n-1} b_{n-2} \ldots b_1) = b_{n-2} b_{n-3} \ldots b_1 0$$

$$NSW_{(1)}(b_{n-1} b_{n-2} \ldots b_1) = b_{n-2} b_{n-3} \ldots b_1 1$$

$$NSW^{(2)}(b_{n-1} b_{n-2} \ldots b_1) = b_{n-1} b_{n-2} \ldots b_1 \quad (1)$$

For example, the switching element 605-3 at third stage STG603 has three connections (as represented by the thick solid line) to the next stage in FIG. 6. The number of switching elements of next stage STG604 for each output port can be obtained from equation (1). The output port '0' of the switching element 605-3 is connected to next stage element 606-1 whose number is "00" and the output port '1' of switching element 605-3 is connected to switching element "01" (e.g. 606-2). The output port '2' of each switching element is connected to the bypass input port '2' of the switching element in the corresponding position of the next stage. There is no special significance to the sequence of input ports in a switching element, in other words, any arbitrary permutation in the sequence of the three input ports can be used without disturbing the system operation.

The bypassing omega network 600 has a number K of multiple output access points for each port of output module 602. In other words, each port 602-1, 602-2, . . . , 602-8 of output module 602, which will be connected to a bypassing module omega network as one sink for the network 600, could receive K packets in a single time-slot. Each port of output module 602 receives a connection wire from the output ports of each switching element of stages having a stage number that is greater than or equal to n. The output connection wires in FIG. 6 run downward to the corresponding port of network output module 602. The output access points, K, can be represented by following equation:

$$K = S_{total} - n + 1, \text{ where n is equal to } \log_2 N \quad (2)$$

For example, K is 2 in the example of FIG. 6. Each output module will have K inputs from the last K stages. In FIG. 6, where K=2, two output access points are drawn for the access of the "000" output module 602-1. One output access point 607-1 comes from the "00" interconnection wire of the switching element 605-1 of third stage STG603 and the other output access point 607-2 comes from the "00" interconnection wire of the switching element 606-1 of fourth stage STG604. These two interconnection wires 607-1 and 607-2 are numbered as "000", which is the same as the address of the output module 602-1 connected to these wires.

Figure 7:
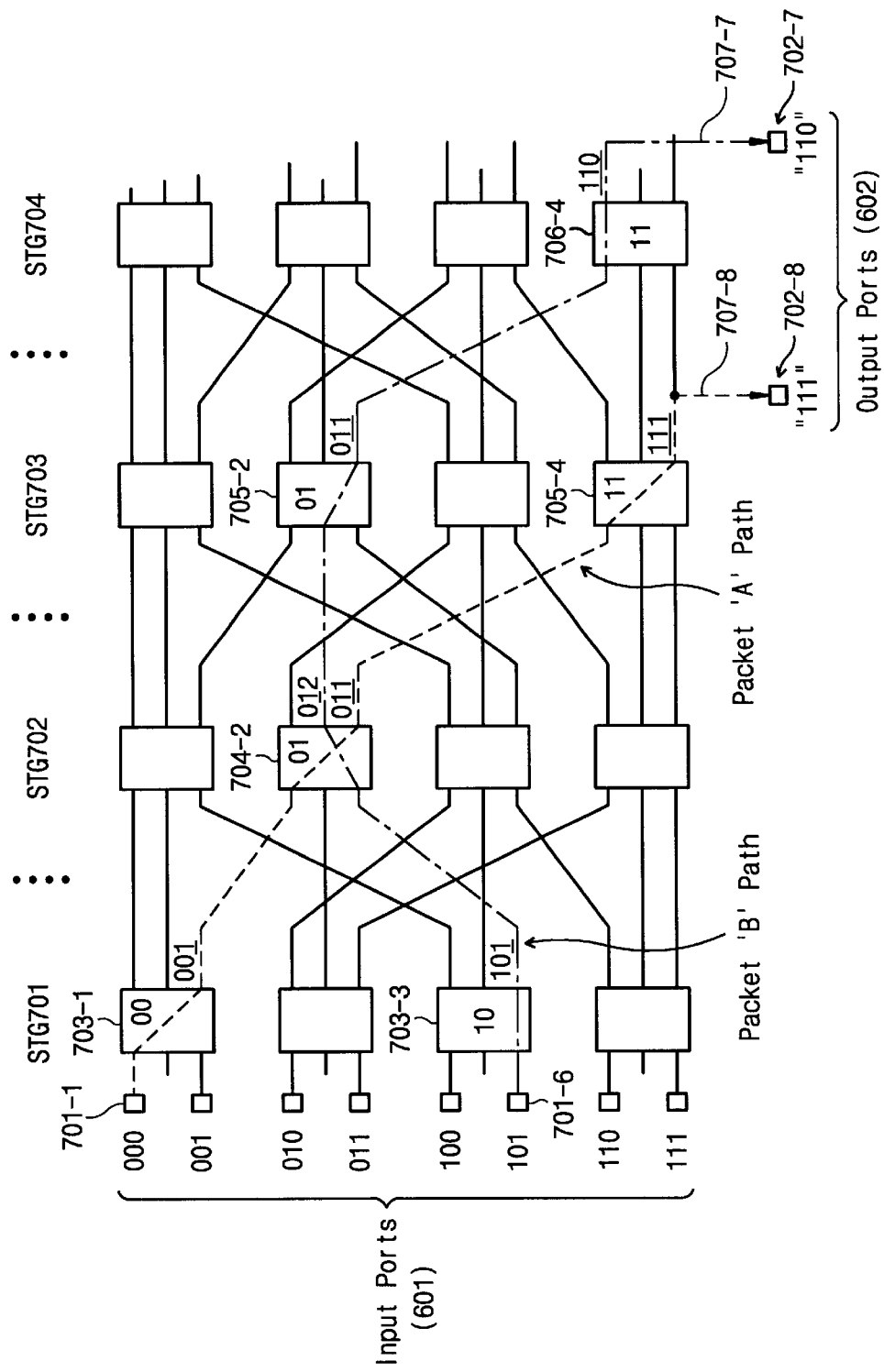
FIG. 7 is a diagram for demonstrating an operation of the routing principle of the bypassing omega network according to the present invention.

FIG. 7 demonstrates the operation of the routing principle of the bypassing omega network according to the present invention. The bypassing omega network of FIG. 7 has the same structure as the network of FIG. 6. The bypassing omega network of the present invention operates through self-routing, bypassing, deflection, and discarding as described below.

Figure 8:
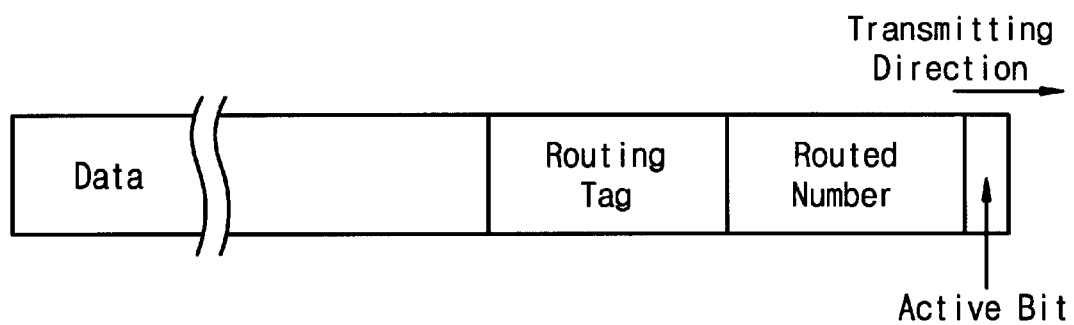
FIG. 8 illustrate an example of the switching packet which consists of an active bit field, a routing tag field, the routed number field, an age field and a data field.

The bypassing omega network performs self-routing by using the destination address as a routing tag, as shown in FIG. 8. However, the bypassing omega network of FIG. 7 is also a multiple path network which has several paths from each input port of input module 601 to each output port of output module 602, in contrast to the omega network which has only one path. The routing principle of the present bypassing omega network is that a switching element will bypass a defeated packet from a routing contention event where two or more packets are destined for the same output port.

As shown in FIG. 7, an example packet, 'A', starts from the "000" source port 701-1 toward its "111" destination port 702-8. The other example packet 'B' starts from the "101" source port 701-6 toward its "110" destination port 702-7. Each of the example packets uses its destination address as a routing tag and is routed toward its destination based upon its routing tag.

In FIG. 7, the packet 'A' is routed to the lower routing port of the switching element 703-1, which is connected to the wire numbered as "001" at first stage STG701, based upon the routing bit, '1', in the most significant bit of the destination address "111". At the second and third stages STG702 and STG703, the packet 'A' is routed to the lower routing ports of the switching elements 704-2 and 704-3 by the middle bit '1' and the least significant bit '1', respectively, of the destination address "111", which is the same operation as the omega network as shown in FIG. 7.

The two example packets 'A' and 'B', contend with each other at the switching element 704-2, "01", of second stage STG702 for the same output routing port because the second digit of the destination address for each packet is '1'. The packet 'A' wins the contention and gets the routing port of the switching element 704-2 and the loser 'B' takes the bypassing port of switching element 704-2. The bypassing of packet 'B' at second stage STG702 moves the 'B' to the switching element 705-2 in the corresponding position "01" of the third stage STG703. The switching elements 703-3, 705-2 and 706-4 at first, second and third stages STG701, STG703 and STG704, respectively, route the packet 'B' and the switching element 704-2 at the second stage STG702 bypasses packet 'B'. Thus, stages STG701, STG703 and STG704 are called as routing stages and the second stage STG702 is called a bypassing stage for packet 'B'.

The routing path of a packet can be described by the sequence of the interconnection wire numbers through which it passes. The routing path of packet 'A' is "00$\underline{1}$"→"0$\underline{11}$"→"$\underline{111}$". The routing path of packet 'B' is "10$\underline{1}$"→"0 12"→"0$\underline{11}$"→"$\underline{110}$". The difference between the two routing paths is the number of interconnection wires traversed which is represented by the increasing sequence of underlined numbers of the address of the interconnection wires.

The routing path of packet 'A' sequentially increases the number of underlined bits of interconnection wire address as the packet traverses the omega network of FIG. 7. By contrast, the number of underlined bits of the interconnection wire addresses for the routing path of packet 'B' do not sequentially increase because the approach toward the destination port is discontinuous. At the second stage STG702, the progress of packet 'B' toward its destination address was delayed because the previous interconnection wire number was "00$\underline{1}$" but the interconnection wire number after the second stage STG702 was "12". The number of underlined digits represents the number of destination address bits which have been processed during routing. For example, the underlined two bits "$\underline{11}$" of "0$\underline{11}$" at stage STG702 which belong to the routing path of packet 'A' means that two bits of the destination address have been processed during a routing tag. When the second stage STG702, which bypassed packet 'B' is omitted, the routing path of packet 'B' becomes the same as the routing path of the omega network, such as '10$\underline{1}$'→('0$\underline{1}$2'→) "0$\underline{1}$1"→"$\underline{1}$10".

When the last digit of the interconnection wire number of the routing path is '2', then it means that the routing packet is bypassed from the switching element 704-2 of the second stage STG702 to the same position switching element 705-2 of the third stage STG703. Thus the routing for packet 'B' which has already been performed is not discarded. The bypassing operation of the present invention, which preserves the completed routing, is different from the operation of a rerouting network or tandem banyan network where the loser in routing port contention loses all the routing which has already been done and the packet starts routing at the beginning. To minimize the loss of completed routing, a modified-data manipulator is used where the routing distance becomes shorter as the number of stages increases. In any event, the packets 'A' and 'B' in FIG. 7 arrive at the intended destination for each packet after passing through three routing stages where each packet takes the correct routing port not the bypassing port.

In this bypassing omega network, a packet destined for port address "$d_{n-1}d_{n-2}\ldots d_0$" arrives at its destination after passing through n routing stages, even though some bypassing stages can be embedded between the routing stages, if a packet is routed according to the $d_i$ bit at the k-th routing stage, where I is defined as n-k, or it is bypassed to the switching element in the same position of the next stage.

As described above, the bypassing omega network of the present invention has multiple output access points, K. In other words, the bypassing omega network permits several packets to arrive at one output destination. To provide for multiple packets, the output module should support several input ports and the switching element should also have some functionality for dealing with multiple packets. The output module catches the packets which have arrived at the interconnection wire whose address is the same as the address of the destination of the packet. Each switching element should discard the packets which will be caught by the output module.

The packets passing through the bypassing omega network are assumed to have a fixed format for the switching operation at each switching element as shown in FIG. 7. This fixed format packet is called a switching packet to differentiate it from the original packet which was received by the switching element. The term "packet" is used to designate a "switching packet" from hereinafter, unless otherwise noted. The switching packet consists of an activity bit, a routing tag (which is the destination address>, the number of routed stages $N_{route}$ of the switching packet, and the original packet data field received at the input port of input module 601 from the transmission line. The number of routed stages of a switching packet $N_{route}$ is set to zero when the switching packet is input to the bypassing omega network and it is incremented by one only when the packet takes the correct output routing port of a switching element through which the packet passes.

The bypassing of a packet can occur at any stage except the last stage in the network, but not all packets can be bypassed to the next stage. A packet cannot arrive at its correct destination if it has bypassed too many stages.

Figure 9:
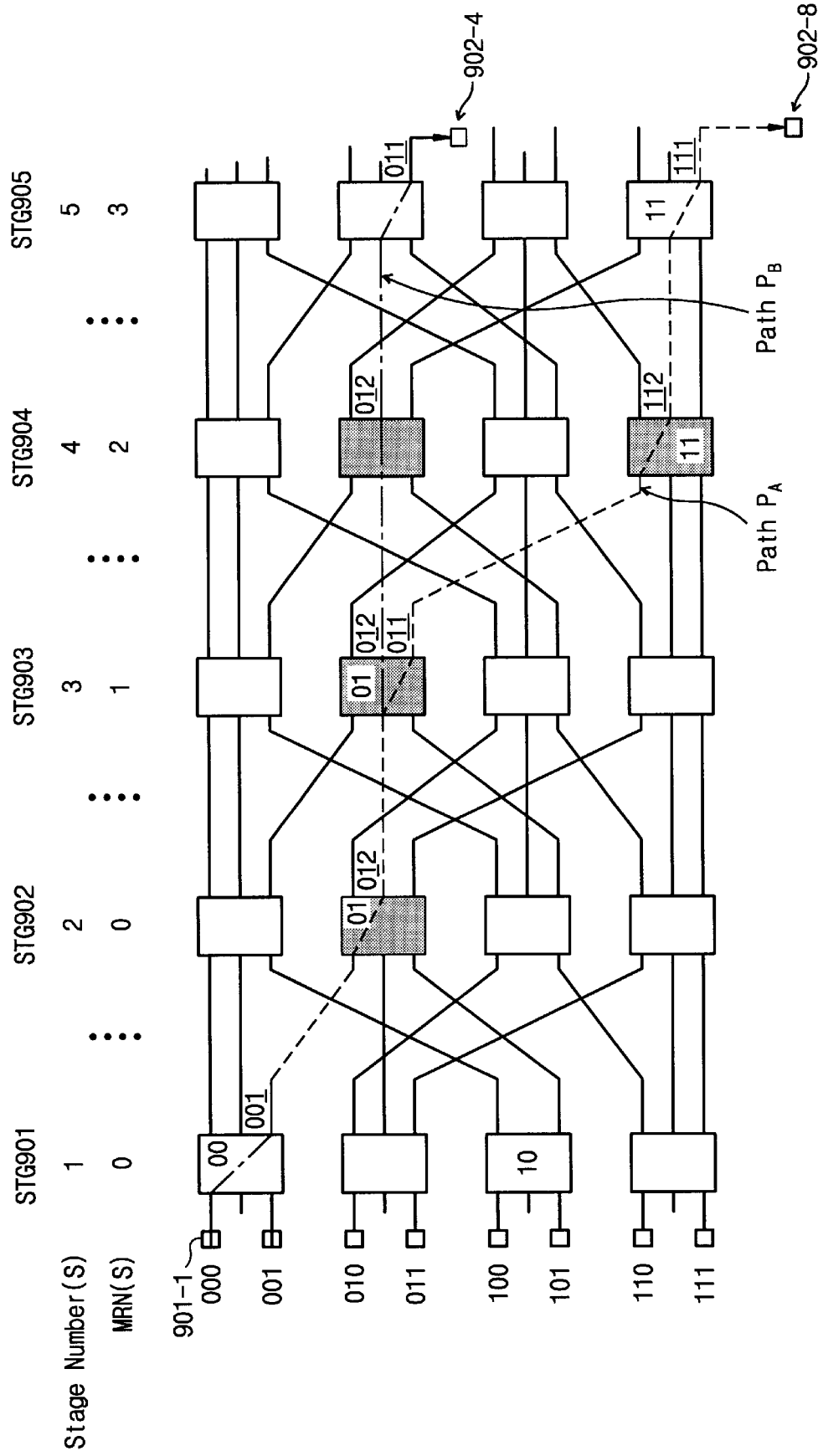
FIG. 9 illustrates two routing paths $P_A$ and $P_B$ of an example packet which starts the source port toward its destination output port.

FIG. 9 shows two routing paths $P_A$ and $P_B$ of an example packet which starts from a source port "000" toward its destination output port "111". Path $P_A$ is "00$\underline{1}$"→"0$\underline{1}$2"→"0$\underline{1}$1"→"$\underline{1}$12"→"$\underline{1}$11" and path $P_B$ is "00$\underline{1}$"→"0$\underline{1}$2"→"0$\underline{1}$2"→"0$\underline{1}$2"→"0$\underline{1}$1". The path $P_A$ correctly routes the packet to its destination. Path $P_B$, however, does not correctly route the example packet. The total number of routing stages in each routing path is 3 for path $P_A$ and 2 for path $P_B$. It is certain that any packet in the bypassing omega network will arrive at its destination address after it has been routed through n stages. So, for a packet to arrive at any one of N output ports from an input port, there should be at least n, where n=log$_2$N, stages in the bypassing omega network, as in the above described omega network and the well-known delta network ("Performance of Processor-memory Interconnections for Multiprocessors", IEEE Transactions on Computers, C-30(10):771–780, October 1981).

Thus, there should be some method for confirming that all packets passing through the bypassing omega network experience at least n routings. The Minimal Routing Number (MRN) to bypass a stage helps to limit excessive bypassing during operation. Before defining the MRN, the extra stage number, Sextra, is defined as:

$$S_{extra}=S_{total}-\log_2 N. \qquad (3)$$

The extra stage number $S_{extra}$ represents the number of additional stages necessary for the multiple paths in the bypassing omega network. For example, in FIG. 9 the extra stage number is 2, i.e. 5-log$_2$8, and the last two stages STG904 and STG905 are additional stages. Also, the minimal routing number at a stage, s, is defined as:

$$MRN(s)=\max(0, S-S_{extra}). \qquad (4)$$

From the formula (4), it can be seen that the minimal routing number (MRN) for each stage is the greater value of either zero or the stage number s minus the number of extra stages $S_{extra}$. For a detailed example, see FIG. 9 where the stages STG901–STG905 are numbered with stage numbers 1–5, respectively, for s and the extra stage number $S_{extra}$. Using equation (3), MRN(1) to MRN(5) corresponding to the stages STG901–STG905 become 0, 0, 1, 2 and 3, respectively.

If any packet at a stage s of the bypassing omega network is bypassed to the next stage when the number of routed stages of the packet $N_{route}$ is greater than or equal to the MRN(s), then the packet can still arrive at its destination by bypassing. Any packet received by a switching element which has a value of $N_{route}$ which is lower than the value of MRN(s) input to the switch element cannot be routed to its destination and must be discarded by the switch element. Therefore, the value of $N_{route}$ can be used when developing the routing priority of packets for higher system performance.

At some switching elements in the bypassing omega network, three packets can arrive and all of them can be destined for the same routing output port. Among the three packets, only one packet can take the correct routing port and another packet can take the bypassing output port. However, the remaining packet cannot be correctly routed or bypassed. But the remaining packet can be routed to an incorrect routing port in order to get a distribution effect (disclosed in "Nonuniform Traffic Spots(nuts) in Multistage Interconnection Networks", Journal of Parallel and Distributed Computing, 10(1):55–57, 1990) with some constraints.

Figure 10:
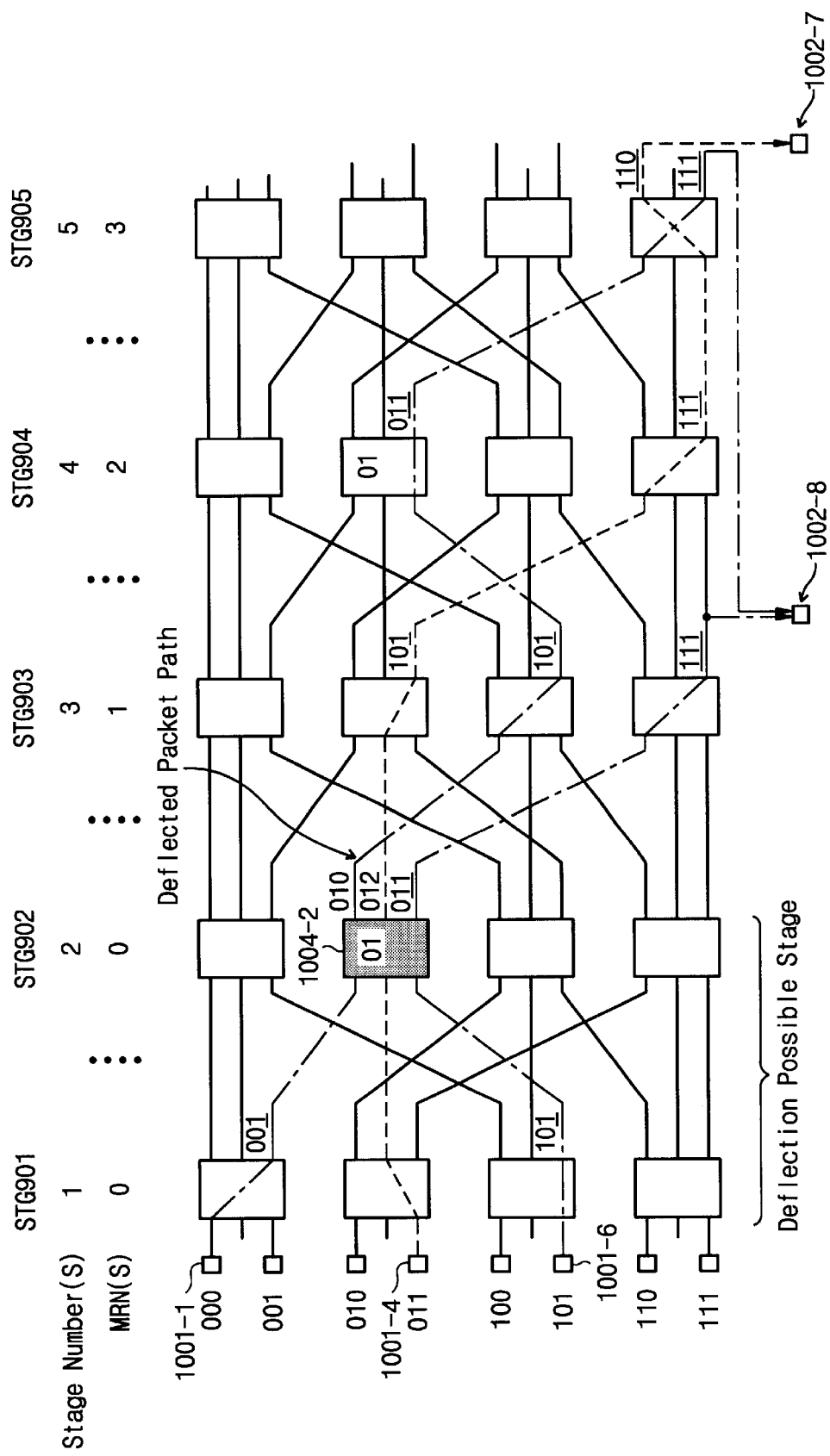
FIG. 10 is a diagram used for explaining the deflection operation of the bypassing omega network shown in FIG. 6.

For example, in FIG. 10, three packets simultaneously arrive at the switching element 1004-2, "01" of second stage STG1002, and all three contend for the lower routing port. One packet takes the lower routing port and another packet bypasses to the next stage STG1003. These two packet routing paths are "10$\underline{1}$"→"0$\underline{1}$1"→"$\underline{1}$11" and "012"→"012"→"01$\underline{1}$"→"1$\underline{1}$1"→"$\underline{1}$10", respectively.

But the last packet path started toward destination address "111" has the routing path "00$\underline{1}$"→"010"→"10$\underline{1}$"→"0

11"→"111". From this last packet path, it can be seen that the number of underlined bits did not monotonically increase but actually decreased when observed at the connection wire after second stage STG1002. In other words, the last packet is routed to an incorrect routing port, the upper routing port of the switching element 1004-2, at second stage STG1002 even though the routing tag of the packet at this stage is '1'. This operation is called a deflection.

When a deflection occurs, the routing which was done at the first stage is lost; see the interconnection wire number "010" which has no underlined bit. But the deflected packet arrives at its destination after passing through the succeeding three routing stages STG1003, STG1004 and STG1005. Thus, even though a packet is deflected at one of the s stages, where the MRN(s) is zero, it can still successfully arrive at its destination address.

The packet in the bypassing omega network flows through the successive stages until it arrives at its destination. Each packet is subject to one of the operations of routing, bypassing, and deflection, at each switching element. But some packets cannot take any of these operations due to contention and the constraints of bypassing or deflection. The packet which cannot take one of the three operations must be discarded if there is no storage element or buffer within the switching element. This discarding leads to packet loss. The packet loss ratio is a very important performance index of a packet switch and it should be minimized for good performance. If the switching element of the bypassing omega network has an internal buffer to store the packets which would otherwise be discarded without the buffer, then the packet loss in the bypassing omega network will be decreased.

As described above, in the bypassing omega network according to the present invention, a packet which arrives at an input port is routed in accordance with the destination address "$b_{n-1}b_{n-2} \ldots b_0$" of the packet. If the routing number $N_{route}$ of the packet is zero, the packet is routed at first stage. If the routing number $N_{route}$ is d, then the packet is routed at the d+1 stage. Each switching element allows the packet to be transmitted through the output routing port according to the routing number $N_{route}$ of the packet, but it allows the routing number to be incremented before transferring the packet.

If more than two packets input to any one switching element have the same routing number, then the switching element can direct only one of the two packets to the desired output routing port. The other packet, which does not get routed to the desired routing port, is transmitted through the bypassing port of the switching element to the corresponding switching element of the next stage. When a packet is bypassed, the routing number $N_{route}$ of the bypassed packet is not incremented.

When several packets are received by a switching element which are destined for the same output routing port at the same time, a higher priority is assigned to the packet which has a higher value for the routing number $N_{route}$. If the number of packets which should be bypassed by the switching element is greater than the number of bypassing ports, then the switching element sets the routing number $N_{route}$ of the other packets to zero and the other packets are transmitted through a specific port to the next stage. In other words, the other packets are deflected.

If the routing number $N_{route}$ of a packet received at an input port is n=$\log_b N$, where b is the number of output routing ports in each switching element and N is the number of input ports of the bypassing omega network, then each switching element discards the received packets. Each output module of the bypassing omega network detects and receives packets where $N_{route}$ is n from ending stages of $S_{total}$-n+1. According to this operation principle, the bypassing omega network of the present invention performs self-routing of packets.

The bypassing omega network of the present invention is very fault tolerant. There are two approaches to obtaining fault tolerance: one is detouring around the faulty elements and the other is removing the faulty elements from the network. In some proposed networks, the packet detours around a faulty switch element with the additionally provided paths but, in order to detour successfully, there must be sufficient extra paths. The other method requires on-line fault detecting capability to detect the faulty elements and to perform an operation to remove the faulty elements from the system without malfunction.

Figure 11:
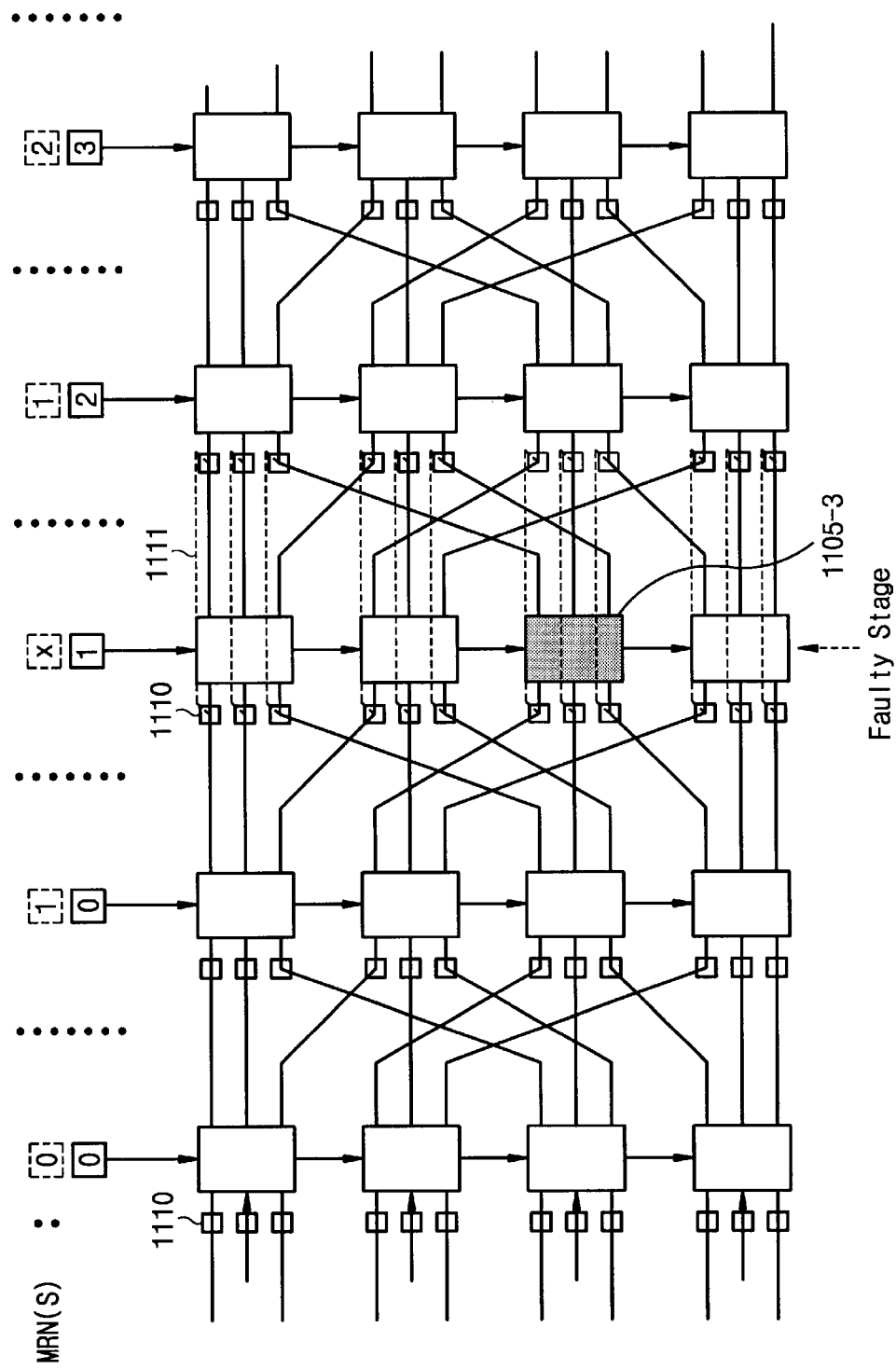
FIG. 11 is a diagram used for explaining the fault tolerance of the bypassing omega network shown in FIG. 6.

FIG. 11 is a diagram for illustrating the high fault tolerance of the bypassing omega network according to the present invention. In FIG. 11, faulty element 1105-3 is shown as a shaded element. The illustrated system can detect the faulty element 1105-3 by monitoring a self-diagnosing pin of each switching element. The self-diagnosing pin of a switching element transitions to a high state and the switching element goes out of service when a watch-dog timer (not shown) times out. When a faulty element is detected, the stage containing the faulty element should be removed from service to prevent malfunction of the network. A stage can be instantaneously removed by the function of a digital switch 1110 which switches to an detour link 1111 which spans between the output from a previous stage and the input of a subsequent stage. The digital switch 1110 incurs a small loss at the input port of each switching element in FIG. 11. When a faulty stage is removed from service, the MRN(s) values supplied to the switching elements of the subsequent stages should be changed to consider the reduction in the number of total stages, $S_{total}$. The MRN(s) changes from the solid boxed numbers shown in FIG. 11 to the dotted box numbers when the fault occurs.

As described immediately above, the bypassing omega network of FIG. 11 allows on-line removal of a faulty stage when the faulty stage is detected during operation. Thus, if the bypassing omega network of the present invention is used, maintenance of the network is very easy and high quality service can be maintained.

The total hardware complexity of the network is dependent upon both the number of switching stages and the number of output access points. When the number of output access points increases, the hardware complexity in the output modules increases. However, the weighting factor for the increase in hardware complexity is greater when the number of stages increases than when the number of output access points increases. Therefore, the relative hardware complexity can be reduced by reducing the number of stages and providing for early arrival of packets at the output modules through an increase in the number of output access points.

When each packet is input to one of the input ports of the switching system, the packet is located at some distance from its destination and the distance of each packet is typically different from the distance of the other packets.

In other words, some packets can arrive at their destination address port having traversed less than n stages. This is because the address of the first switching element, $S_{-1}$ $S_{n-2} \ldots S_1$, can have some of the same patterns as that of the destination, $d_{n-1}d_{n-2} \ldots d_0$. For example, if the starting source address of a packet, $S_2S_1$, is the same as the destination address, $d_{n-1}d_{n-2}$, then the packet can arrive at its destination within just n−2 routing stages when the routing tag is used from the bit, $d_{n-2}$. In this case, the packet arrives at its destination within n−2 routing stages and arrives early at its destination address.

Figure 12:
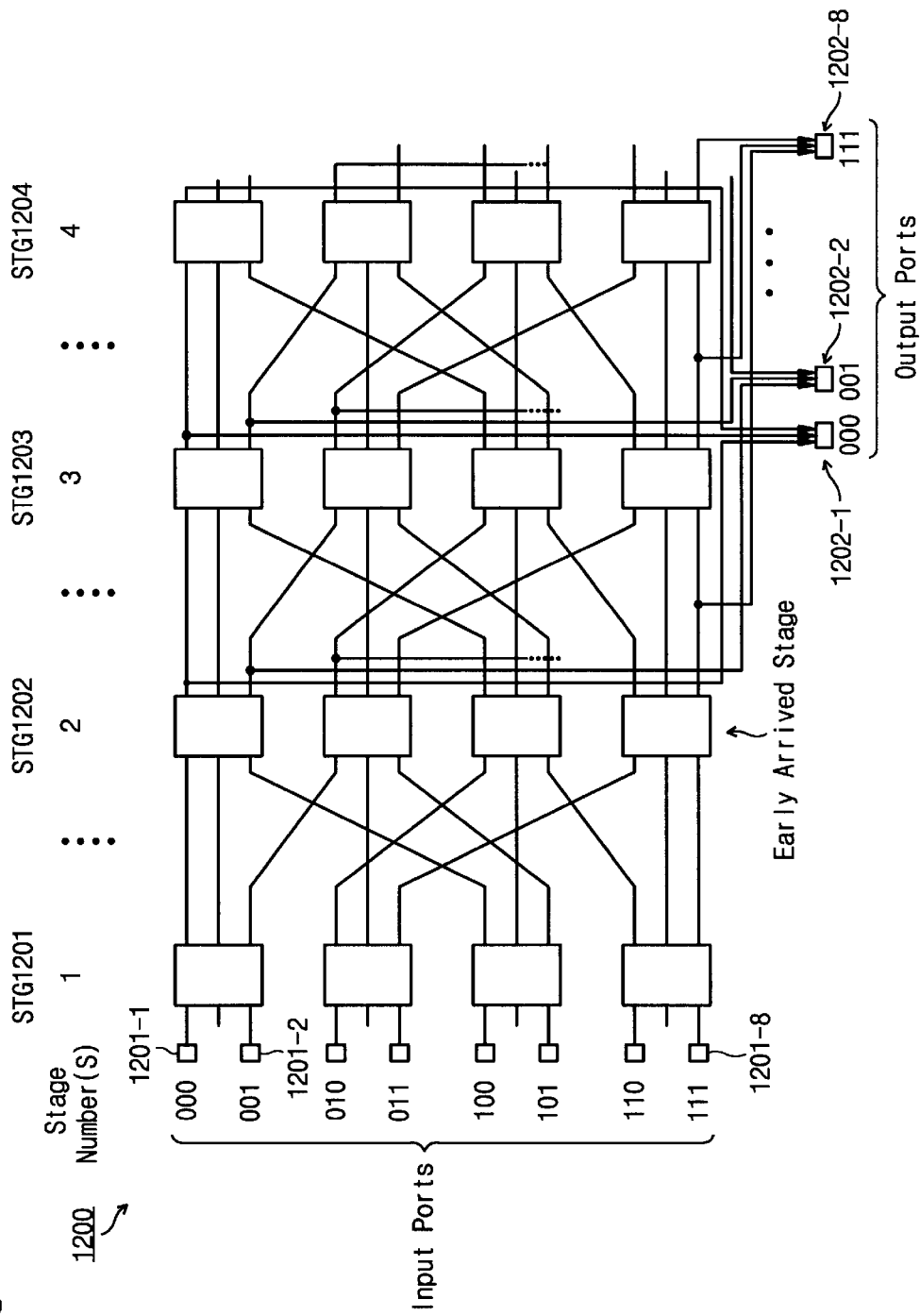
FIG. 12 is a block diagram showing another example of the bypassing omega network according to the present invention.

FIG. 12 shows the change in the architecture of the bypassing omega network which provides for early arrival of packets. Only one additional output access point per port in one stage is introduced in FIG. 12. When the number of additional output access points is I from the above equation (2), then the input module, $S_n$-$S_{n-2}$ . . . $S_1S_0$, checks the relative distance of a packet starting from the input module to the destination, $d_{n-1}d_{n-2}$ . . . $d_0$ of the packet. The input module shifts the address $d_{n-1}d_{n-2}$ . . . $d_{n-1}$ from left to right and compares each bit to source address $S_lS_{l-1}$ . . . $S_1$ to figure out the maximum number of bits in $d_{n-1}d_{n-2}$ . . . $d_{n-dr}$ and $S_{dr}S_{dr-1}$ . . . $S_1$ which are the same and the input module inserts the number of matching bits, $d_r$, into the number of routed stages of the packet, $N_{route}$. When the packet arrives at its destination address, then it will have traversed n−$d_r$ stages.

Increasing the size of switching element is another well-known method for decreasing the number of stages in a network. The size of the switching elements can be increased in the conventional omega network (disclosed in "Performance of Processor-Memory Interconnections for Multi", IEEE Transactions on Computers, C-30(10) :771–780, October 1981) by introducing q shuffle or qr objects where q and r are integer powers of 2. The network of FIG. 12 can be adapted to become a 64*64 extended omega network where each switching element does 4*4 switching and the total number of stages is $\log_4 64$ or 3. The interconnections are made by 4-shuffle of 64 ports; divide 4 piles of 16 ports and connect each top unconnected ports to the input port of next switching element. When the bypassing connection is added between the same position switching elements of the adjacent stages in FIG. 12 then the network becomes a bypassing omega network. Increasing of the switching element size can thus reduce the number of stages in the network.

Figure 13:
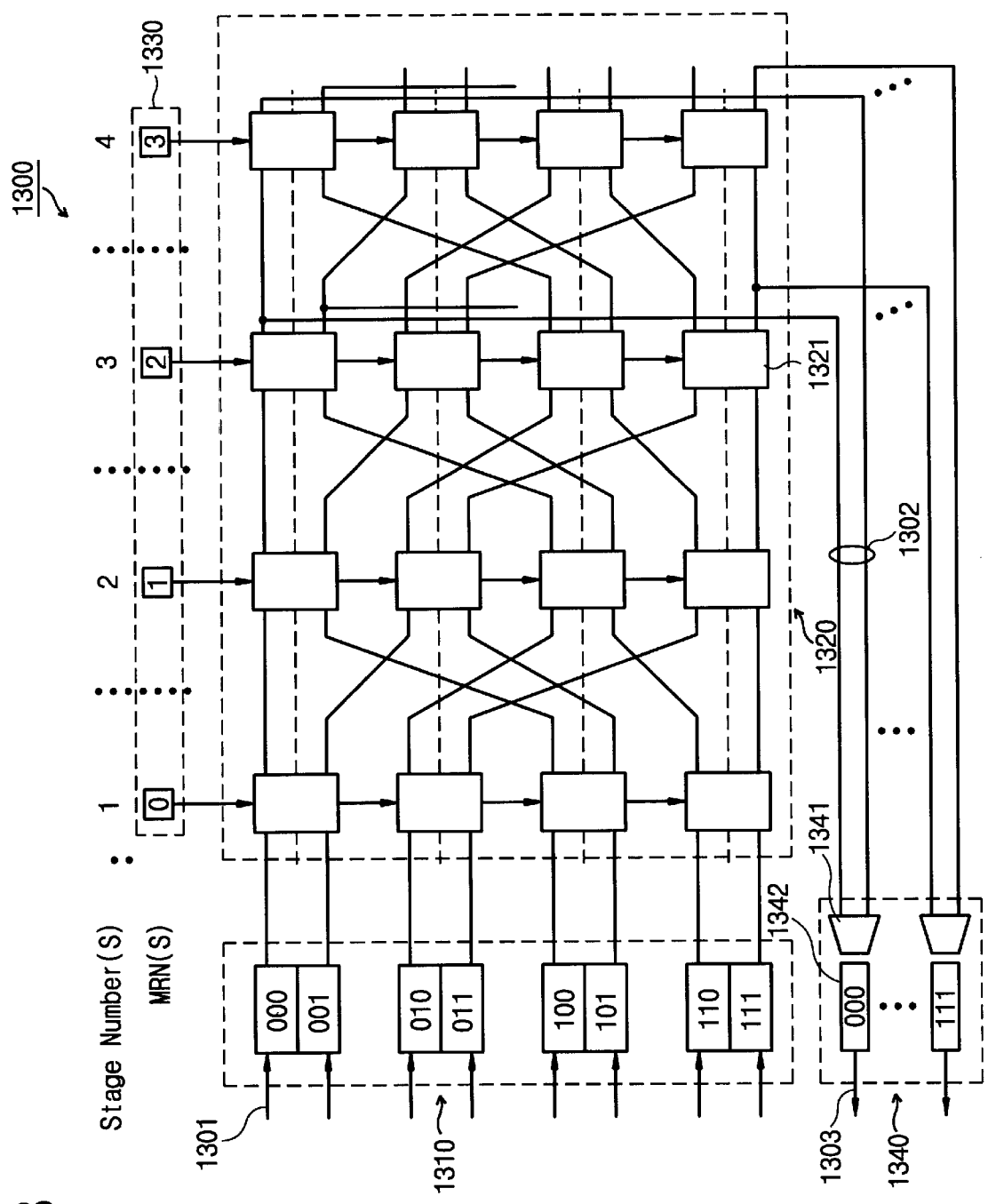
FIG. 13 illustrates a packet switch system which is incorporated with output buffering scheme and in which the bypassing omega network of the present invention is embodied.

FIG. 13 shows a packet switch system which incorporates an output buffering scheme along with the bypassing omega network of the present invention. The packet switch system 1300 has an input module 1310, a bypassing omega network 1320, MRN generation logic 1330 and an output module 1340. The input module 1310 receives packets from the transmission line 1301. Each input module 1310 is configured to convert each received packet into a switching packet which includes the information necessary for the received packet to route through network 1320. The input module may also be adapted perform an address translation operation or other operations related to the termination protocol.

Figure 14:
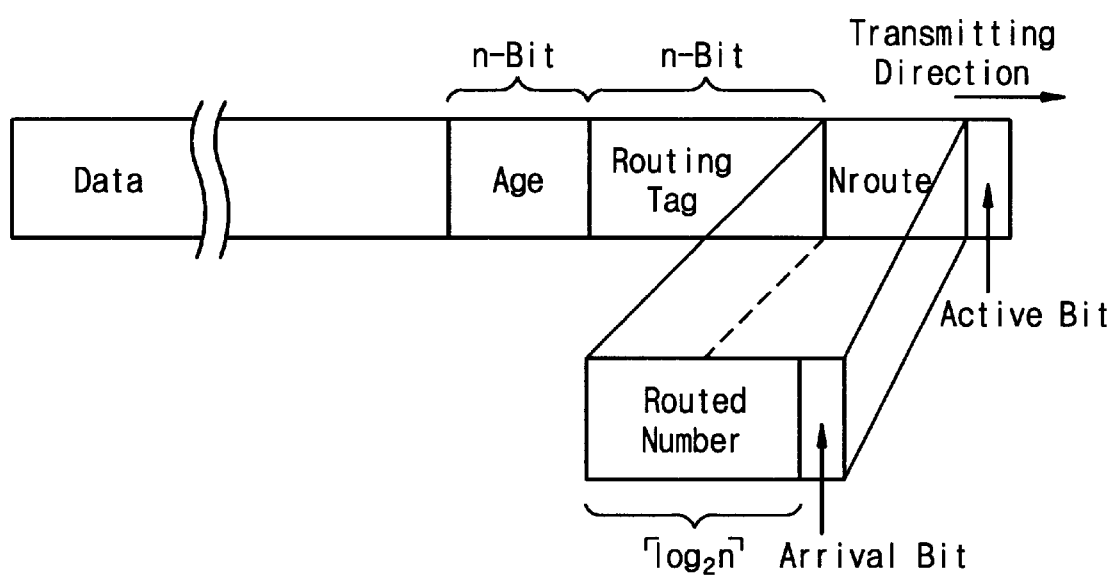
FIG. 14 is a diagram showing the format of the switching packet for the packet switch system.

The MRN generation logic 1330 supplies the MRN(s) to each switching stage. The format of the switching packet for the packet switch system 1300 is shown in FIG. 14. The switching packet consists of an active bit field, a routing tag field, the routed number $N_{route}$ field, an age field and a data field, similar to the packet format shown in FIG. 8.

Referring now to FIG. 14, the age field is attached to minimize a packet disordering problem which can arise. The packet disordering problem can be prevented or alleviated by maintaining the packet sequence at each switching element with the assistance of a comparison of the age fields among the contending packets. For example, each switching element, such as switching element 1321, in the bypassing omega network 1320 has a small input buffer and the packets in this buffer can be delayed for several time-slots. A time-slot is the time duration required to pass a packet from one stage to another across the interconnection wires in the packet switch system.

The disordering problem can arise where two packets arrive simultaneously at a switching element and one packet leaves the switching element earlier than the other. This variable delay in the switching element can cause the packet disordering problem. But this problem can be avoided when the internal buffering scheme is used. The disordering problem can be alleviated by introducing the age field which counts the number of time-slots that the packet has spent in the system from the time of insertion of the packet into the bypassing omega network 1320 by the input module 1310.

The bit width of the age field is limited to n-bits in order to use the minimum amount of bandwidth in the system. The minimal bit width is $[\log_2 n]$ to represent the number of routed stages in the NXN packet switch because the maximum value of the bit width is n by the equation $n=\log_b N$. However, one more bit was added to the value of $\log_2 n$ to simplify the packet arrival operation in the output module 1340. A packet is output to the output module 1340 when it has passed n routing stages and the next stage discards the arrived packet. To simplify this operation, the arrival bit follows the activity bit which represents whether the following packet is an idle packet or an active packet.

Returning to FIG. 13, the output port in output module 1340 connected to the interconnection wire 1302 intercepts the packet and the next switching element discards the packet when the arrival bit of the packet is set to 1. However, the output module 1340 will ignore the packet and allow the following stage switching element to take the packet and continue routing if the arrival bit of the packet is 0.

The lengths of all switching packets in the packet switch system are identical throughout the bypassing omega network, but each field can change as the packet proceeds through the stages. Generally, the routing tag is shifted to the right by one bit so that each switching element at every routing stage can route the packet according to the bit in the same position.

However, to deflect a packet, the whole routing tag must be available in order to restart the packet in the following stage. Thus the routing tag is fixed throughout the switching network while the routing bit at each stage is readily extracted using the number of routed stages $N_{route}$.

Figure 15:
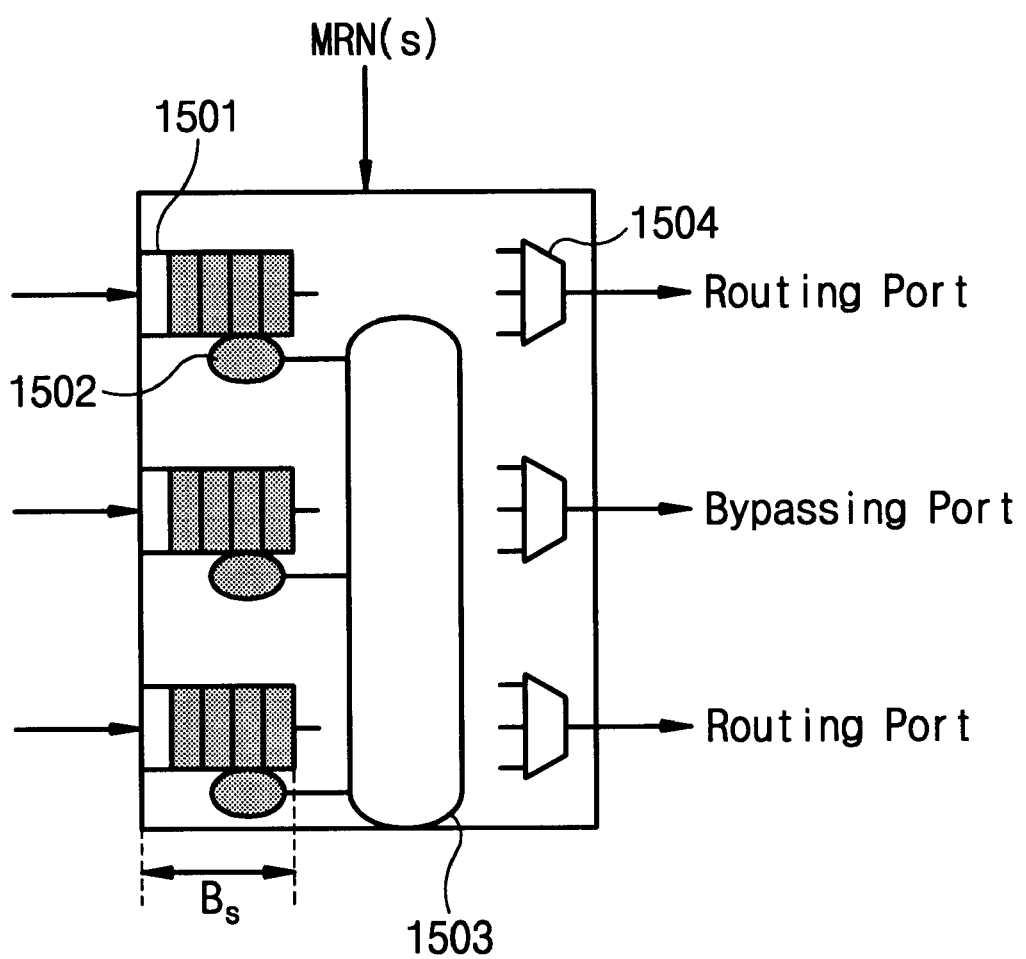
FIG. 15 illustrates an example of the switching element which is used in the packet switch system of FIG. 13.

The switching elements of network 1320, such as switch element 1321, can also be provide with output buffering capability, as illustrated in FIG. 15. Switching element 1321 includes an input buffer 1501, which is a so-called tail-spared buffer, for each input port in order to do internal buffering. The tail-spared buffer 1501 does internal buffering, as shown in FIG. 15, to increase the performance of the network 1320. The tail-spared buffer 1501 operates as a First-In First-Out (FIFO) queue which can buffer $B_s$ packets and where the last space of the buffer is always reserved for a packet which may arrive during the next time-slot in order to perform output buffering for the previous stage. The switching element does not check whether there is space available in the tail-spared buffer in the following elements before it sends a packet to the next stage of the network or to the output module 1340.

The operation of the switching element 1321 can be demonstrated by the operation of the input port controller 1502 and the central priority arbitrator 1503. The input port controller 1502 receives the packet from the input port and either stores or routes the packet to one of the output ports with the assistance of the central priority arbitrator 1503.

Figure 16:
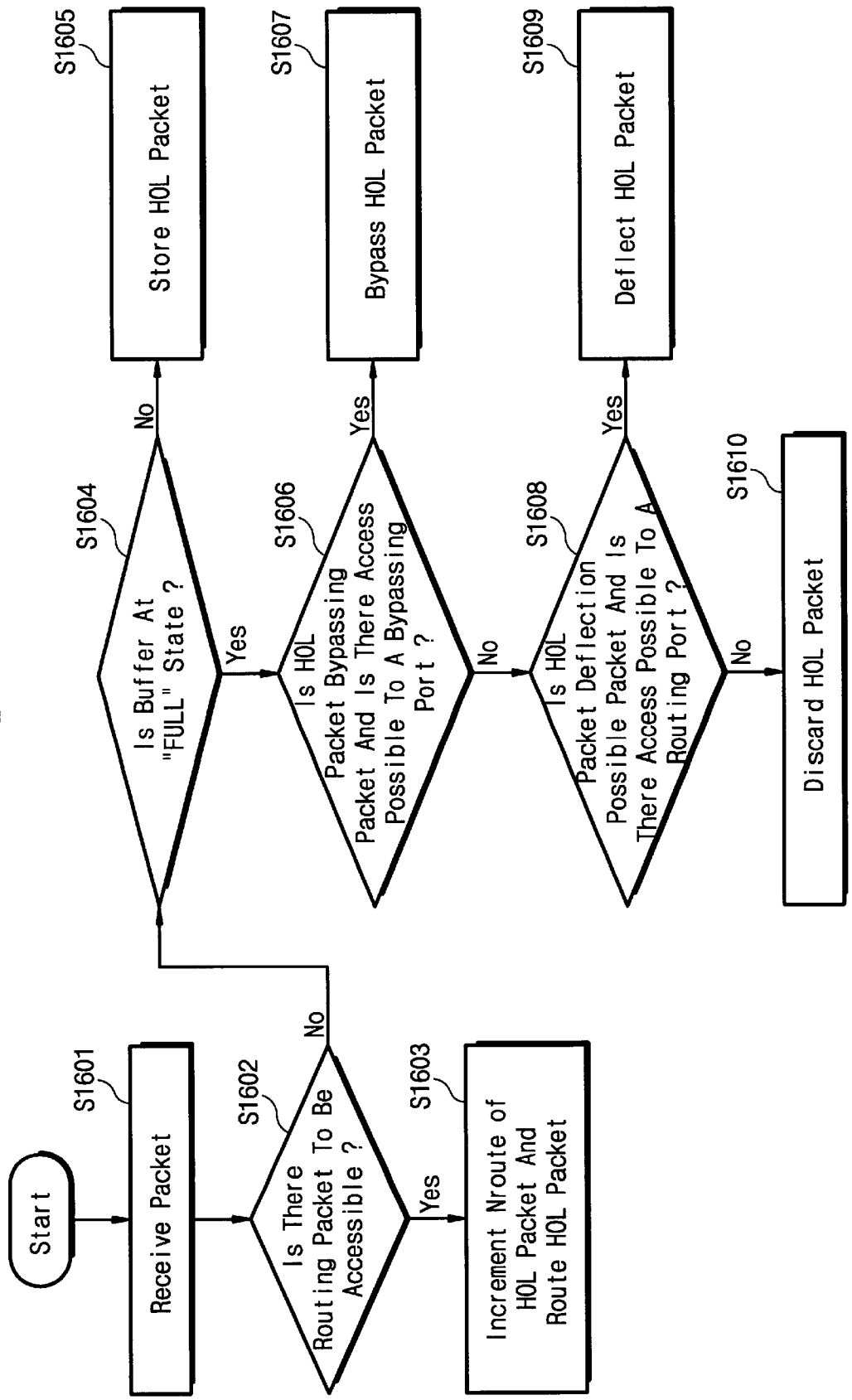
FIG. 16 is a flow chart showing the operation of the input port controller.

FIG. 16 is a flow chart showing the operation of the input port controller 1502 of FIG. 15. At the beginning of a time-slot, as shown in FIG. 16, the input port controller 1502 receives a packet at step S1601. Control then proceeds to step S1602 wherein, after the Head-Of-Line (HOL) packet is completely received, the controller 1502 decides whether there is a routing output port available for the packet. If so, then control proceeds to step S1603 wherein the controller 1502 increments the routing number $N_{route}$ of the HOL packet and directs the packet to the routing port. However, if no routing port is available, then control proceeds to step S1604 wherein the controller 1502 decides whether the tail-spared buffer 1501 is in a "FULL" state.

If the buffer 1501 is not in a "FULL" state, then the HOL packet is stored in buffer 1501. But, if the buffer 1501 is in a "FULL" state, then control proceeds to step S1606 wherein the controller 1502 decides whether the received HOL packet is a bypassing packet and whether there is a bypassing port available for the packet. If a bypassing port is available, then control proceeds to step S1607 wherein the HOL packet is bypassed.

Otherwise, control proceeds to step S1608 wherein the controller 1502 decides whether the HOL packet can be a deflection packet and whether there is the routing port available for deflection. If a routing port is available, at step S1608, then control proceeds to step S1609 wherein the HOL packet is deflected. If no routing port is available, the control proceeds to step S1610 wherein the HOL packet is discarded.

In each switching element 1321, three input port controllers 1502 independently perform the decision procedure to decide which operation to undertake among routing, bypassing, deflecting and storing. The central priority arbitrator 1503 arbitrates the allocation of output ports, as shown in FIG. 15, among the input port controllers 1502, where each input port controller sends the routing direction of its HOL packet along with the information on whether the HOL packet is bypassable, the age, and the number $N_{route}$ of routed stages fields of the HOL packet to the central priority arbitrator 1503. The operation selected for each packet, as determined with the assistance of the central priority arbitrator 1503, proceeds at the moment that the decision procedure ends and before the tail of the received packet arrives. This operation is called a "virtual cutthrough", wherein a packet is transmitted to the following destination once the control data for the packet has arrived but before the entire data portion of the packet has been received.

The aging operation occurs during a time-slot when packets are stored in the tail-spared buffer and are not sent to an output port. When a packet remains in the buffer during a time-slot, then the aged field is incremented for the packet.

The central priority arbitrator 1503 arbitrates the priority among the three input port controllers 1502 in order to resolve the contention for the same routing port. The global arbitration procedure of the central priority arbitrator 1503 is illustrated in FIG. 17.

Figure 17:
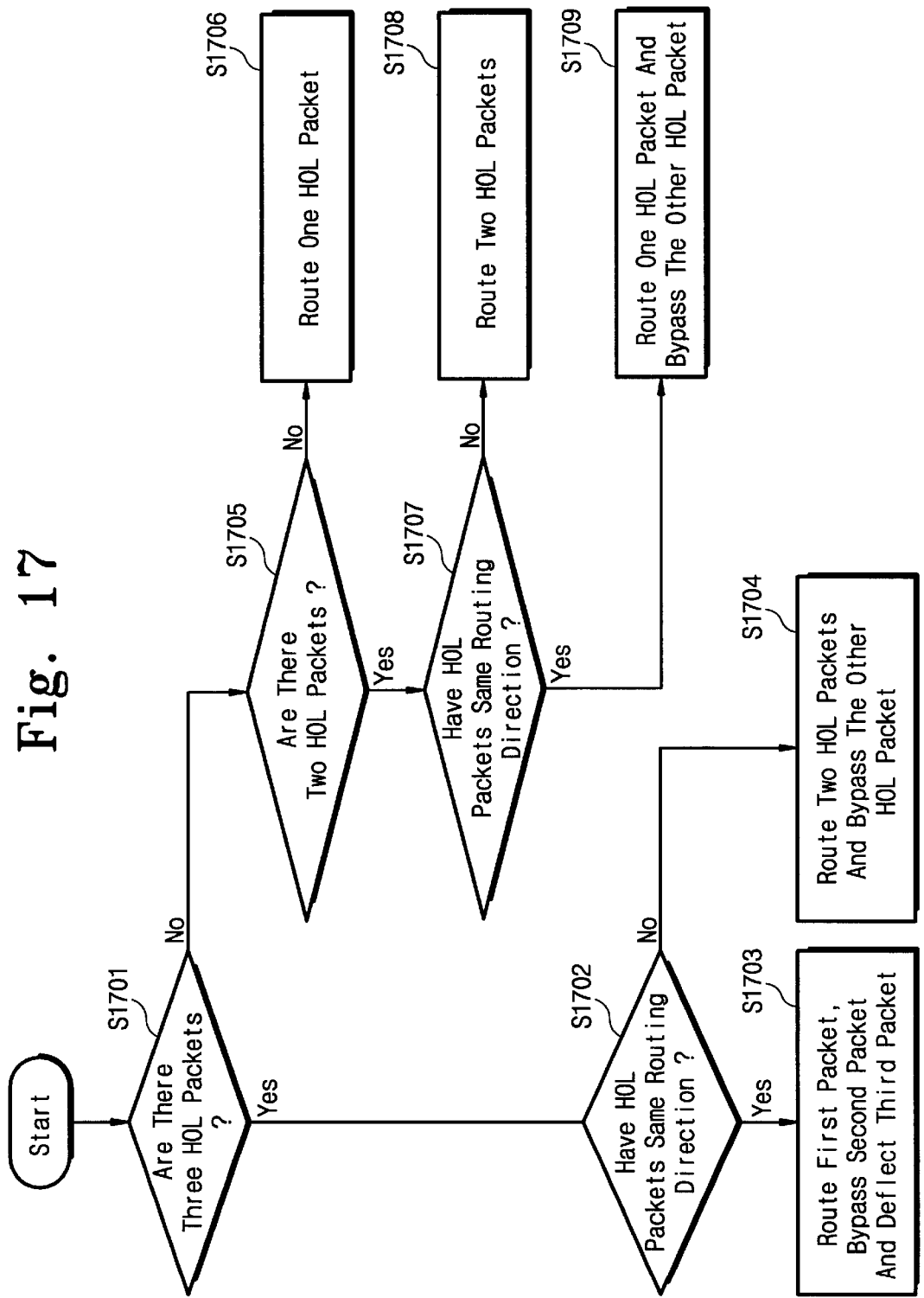
FIG. 17 is a flow chart showing the global operation of the central priority arbitrator.

Beginning at step S1701 of FIG. 17, the central priority arbitrator 1503 determines whether there are three HOL packets or not. If so, then control proceeds to step S1702 wherein the arbitrator 1503 determines whether the three HOL packets have the same routing direction or not.

At step S1702, if the HOL packets have the same routing direction, then control proceeds to step S1703 wherein a first packet of the HOL packets is routed, a second HOL packet is bypassed and a third HOL packet is deflected. The HOL packet having the highest age value and the highest routing number $N_{route}$ is transmitted to the routing port. The HOL packet with the next highest age and next closest to its destination is bypassed to the following stage.

If the three packets do not have the same routing then control proceeds from step 1702 to step S1705, wherein two HOL packets are routed and the other HOL packet is bypassed. When control proceeds to step S1705, the arbitrator 1503 determines whether there are two HOL packets or not. If so, then control proceeds to step S1707 where it is determined whether the two HOL packets have the same routing direction or not. If there is only one HOL packet, then control proceeds to step S1706 wherein the one HOL packet is routed.

If there are two HOL packets and they have the same routing, then control proceed from step S1707 to step S1709 wherein one HOL packet is routed and the other HOL packet is bypassed. Otherwise, control proceeds to step S1708 wherein both the HOL packets are routed.

Deflection in the bypassing omega network according to the present invention occurs only when the MRN(s) is zero. In other words, deflection occurs only within the first several stages of the network. However, bypassing can occur at any stage of the network except the last stage.

Turning back to FIG. 13, the output module 1340 receives packets from the bypassing omega network 1320. This module 1340 can receive K packets simultaneously in a time-slot, remove the routing information attached to each packet, and retransmit the packet on an output transmission line, such as output transmission line 1303 connected to the 000 output port 1342 of output module 1340. The output module 1340 receives the packets via the K input ports 1341 of the output module 1340 which come from the internal connection wires 1302 having the same address as the output port 1342 of the module.

Each input port 1341 has a packet filter (not shown) which filters the packets whose arrival bits are 1. The output module 1340 has a shared buffer which can save up to $B_O$ packets.

When multiple packets arrive simultaneously in the output module 1340, then the memory access time of the shared buffer can become the bottleneck for system performance, if a plurality of memory blocks are used for ports 1342 to save the multiple packets in the time-slot. A knockout switch is proposed as a good shared output buffer architecture with multiple memory blocks and shifter. The concentrator of a knockout switch is used for the packet concentration as disclosed in "The Knockout Switch: A Simple, Modular Architecture for High-Performance Packet Switching", IEEE Journal on Selected Areas in Communications, SAC-5(8):1274–1283, October 1987.

Despite the so-called Head-Of-Line (HOL) problem, the input buffering scheme described above with respect to the conventional networks has several merits when compared to the output buffering scheme. The HOL problem can be tackled by using a good switching network which avoids long waits at the head of the line, i.e. at the front of input buffer. Input buffering does not permit switching resources to be wasted on packets which can be lost somewhere in a later stage of the network. Generally, input buffering is regarded as more appropriate than the output buffering in performing high-quality flow control.

Also, it is possible to reduce the complexity of the switching fabric by input traffic shaping, whereas in pure output buffering a large switching fabric is required to reduce packet loss. Moreover, in the input buffering scheme, the cost of a large input buffer is negligible because there are already high-density memory chips available for the purposes of protocol termination, address translation and routing information attachment and so on. Nevertheless, output buffering is still required in order to obtain high throughput, because without multiple output access points per output the switching fabric rapidly jams and throughput is seriously affected.

Figure 18:
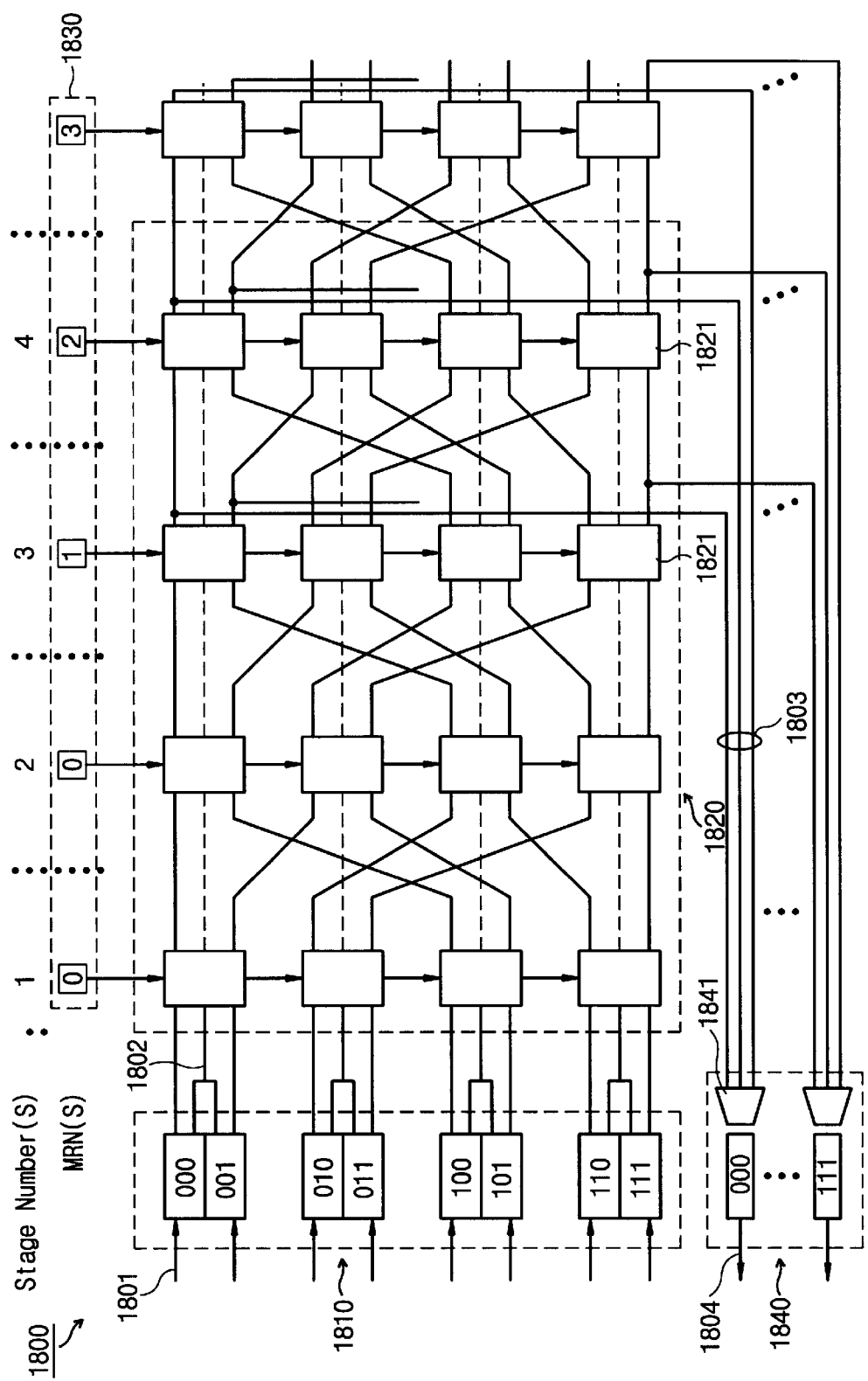
FIG. 18 illustrates another packet switch system which uses the bypassing omega network of the present invention as the switching network and adopts input and output buffering.

FIG. 18 shows a packet switch system which uses the bypassing omega network of the present invention as the switching network 1820 and adopts input and output buffering. In FIG. 18, the packet switch system 1800 includes input module 1810, MRN generating logic 1830 and output module 1840. The system 1800 of FIG. 18, unlike the system of FIG. 13, also has a shared bypassing input link 1802.

In order to perform input buffering, each switching element 1821 should have a back-pressuring signal which prevents excessive packet arrival when its internal buffer is full. Even though the back-pressuring signal is not drawn in FIG. 18, the output module 1840 and every switching element 1821 have a back-pressuring signal. The architecture and operation of each part are explained in following subsections.

The general operation of the input module 1810 is similar to that of the output buffering packet switch system 1300 which is shown in FIG. 13. But the input module 1810 has a buffer whose size is $B_i$ and the module checks whether the switching element in first stage attached to each input buffer of input module 1810 has space available or not before it sends a switching packet. Each input module buffer 000–111 is connected to a shared bypassing input link 1802 along with an adjacent input buffer under the assumption that odd-numbered input buffers, i.e. 001, 010, . . . , use the input link 1802 during odd-numbered time-slots while the even-numbered modules use input link 1802, unlike the system of FIG. 13 the even-numbered time slot. Each input buffer uses this shared bypassing link 1802 to rapidly lower the input buffer level when the input buffer occupation level exceeds 50%.

The format of each switching packet which is translated by the bypassing omega network 1820 is similar to the format of the output buffering packet switch shown in FIG. 14. However, the routing tag format for network 1820 is not fixed, as in the output buffering packet switch of FIG. 13, because deflection is not permitted in this packet switch system 1800 when the number of routed stages, $N_r$, is not zero.

Figure 19:
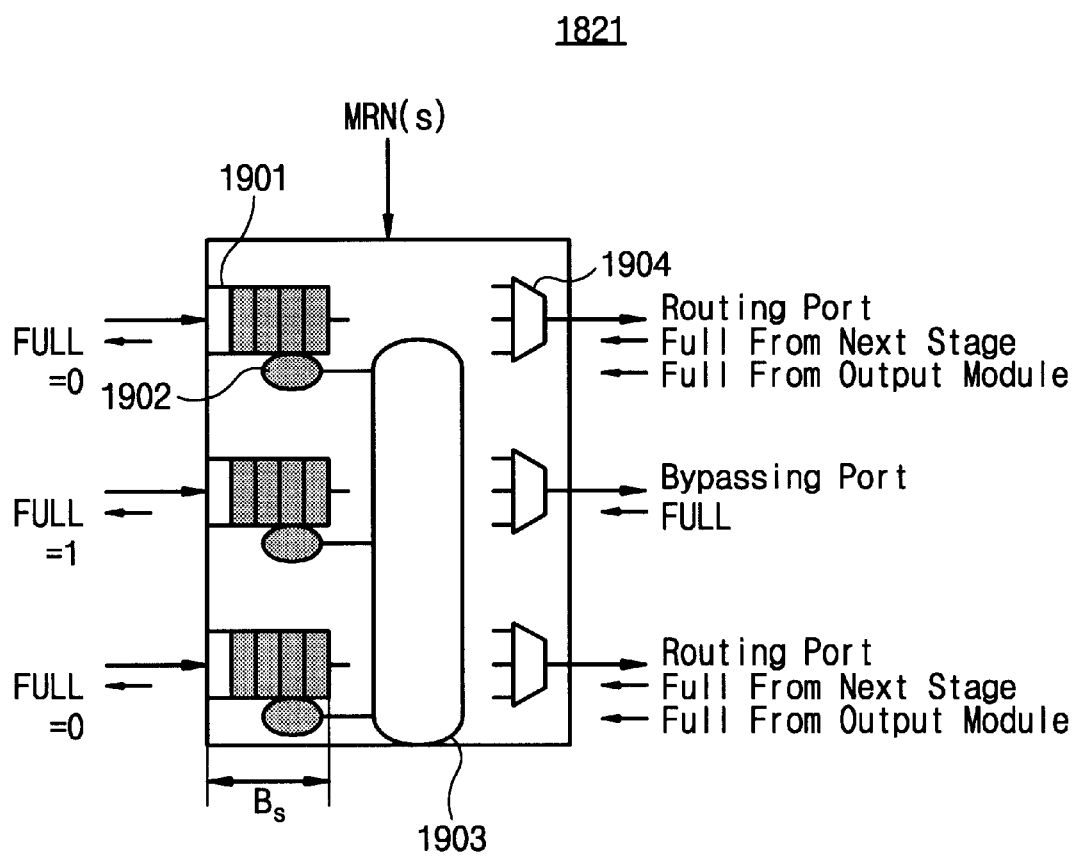
FIG. 19 illustrates a switching element of the packet switch system shown in FIG. 18.

FIG. 19 shows a switching element 1821 of the packet switch system 1800 shown in FIG. 18. Switching element 1821 has an input buffer 1901 for each input port to do internal buffering. But buffer 1901 differs from the tail-spared buffer shown in FIG. 15. The internal buffer 1901 of each switching element 1821 backpressures the system by setting the backpressuring signal FULL, as shown in FIG. 19, when the buffer 1901 does not have space available to accept an incoming packet. Each switching element 1821 also receives the FULL signal from the next stage switching element and the output buffer of output module 1840 which are connected to the switching element with connection wires. As a result, packet discarding does not occur within the switching network but is performed in the input module when the input buffer 1901 overflows.

The operation of switching element 1821 can be illustrated by the operation of the input port controller 1902 and central priority arbitrator 1903. The input port controller 1902 receives the packet from its corresponding input port and stores or routes the packet through a multiplexer 1904 to an output port with the assistance of the central priority arbitrator 1903.

Figure 20:
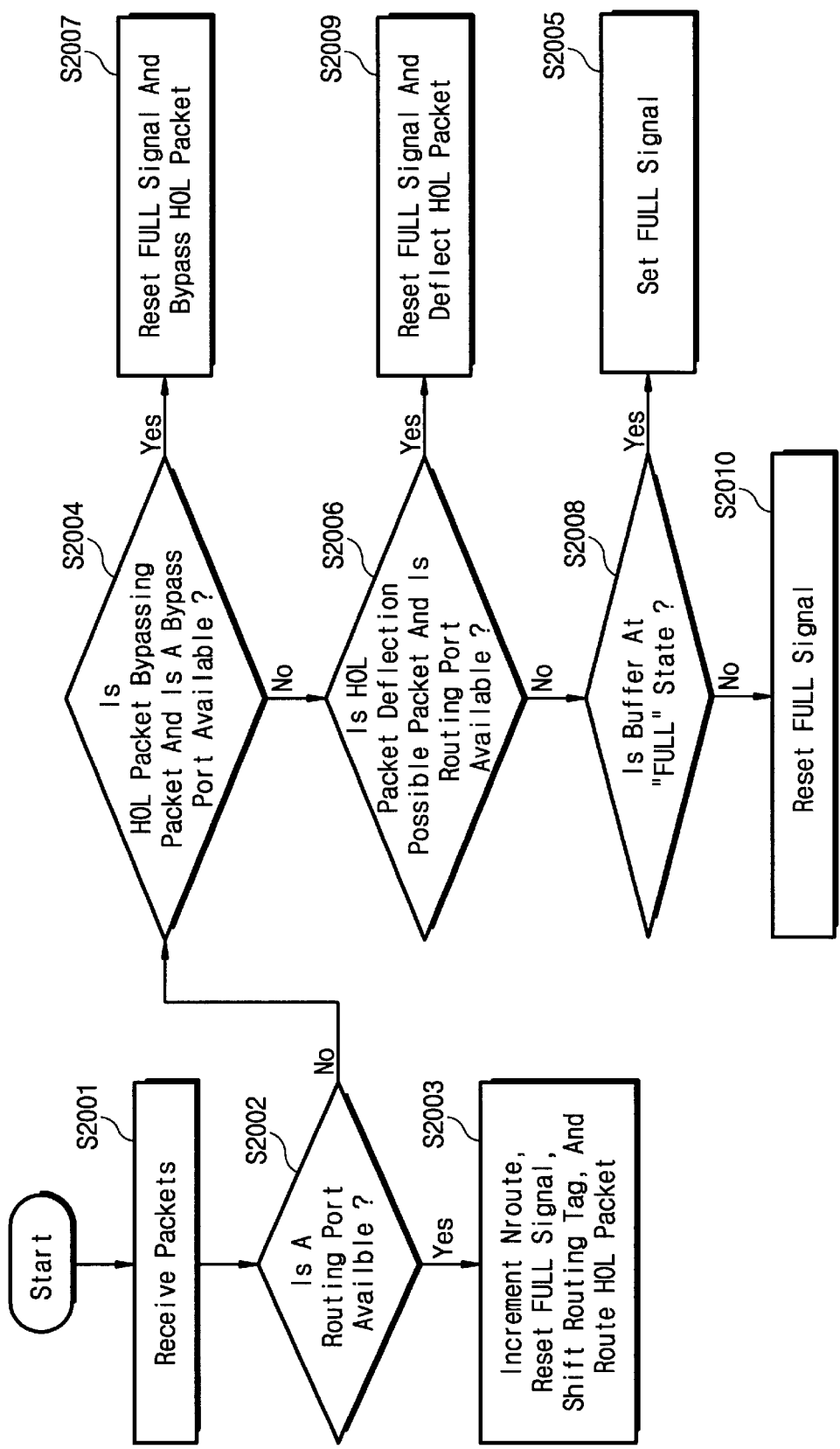
FIG. 20 is a flow chart showing the operation of the input port controller.

The operation of the input port controller 1902 is illustrated by a flow chart in FIG. 20. During a given time-slot, the input port controller 1902 receives packets at step S2001. Control then proceeds to step S2002 wherein, after the HOL packet is completely received, the controller 1902 decides whether there is a routing port available or not.

If routing port is available at step S2002, control proceeds to step S2003 wherein the controller 1902 increments the routing number $N_{route}$ of the HOL packet, resets the FULL signal in the left direction towards the preceding switch element output port or input port buffer, shifts the routing tag and directs the packet to the routing port.

However, if no routing port is unavailable at step S2002, then control proceeds to step S2004 wherein the controller 1902 decides whether the received HOL packet is a bypassing packet and whether there is a bypassing port available. If a bypassing port is available, then control proceeds to step S2005 wherein the FULL signal is reset and the HOL packet is bypassed.

If no bypass port is available at step S2004, then control proceeds to step S2006 wherein the controller 1902 decides whether the HOL packet is a deflection possible packet and whether there is a routing port available to deflect the packet. If a routing port is available for deflection at step S2006, then control proceeds to step S2009 wherein the FULL signal is reset and the HOL packet is deflected.

If no port is available for deflection at step S2006, then control proceeds to step S2008 wherein the controller 1902 decides whether the buffer 1901 is in a "FULL" state. If the buffer 1901 is in a "FULL" state, then control proceeds to step S2005 wherein the FULL signal is set. If the buffer 1901 is not in a "FULL" state at step S2008, then control proceeds to step S2010 wherein the FULL signal is reset.

In contrast to the routing tag shown in FIG. 15, the routing tag in the network of FIG. 18 is shifted to the left so that every switching element can consider the first bit of the tag as the routing bit for that switch element. This is possible because deflection is only permitted when the number of routed stages $N_{route}$ of a packet is zero. This shifting reduces the hardware complexity of each switching element.

The operation of the central priority arbitrator 1903 in FIG. 19 is similar to that of FIG. 15. However, granting of an output port in the arbitrator 1903 of FIG. 19 is allowed only when the FULL signal received by the output port from its input port in the next stage is zero. Furthermore, if a packet arrives at its destination output from the network after routing through a switching element, then the switching element should check whether the output buffer of output module 1840 has space or not by examining the FULL signal which comes from the output module.

Returning to FIG. 18, the output module 1840 has $B_o$ buffer space and can receive K simultaneous packets. The operation of the output module 1840 is the same as explained in FIG. 13 with the exception of the inclusion of the back-pressuring signal FULL. When the available buffer space k is less than K, then the first k switching elements connected to the output module can send packets to the output module.

Figure 21A:
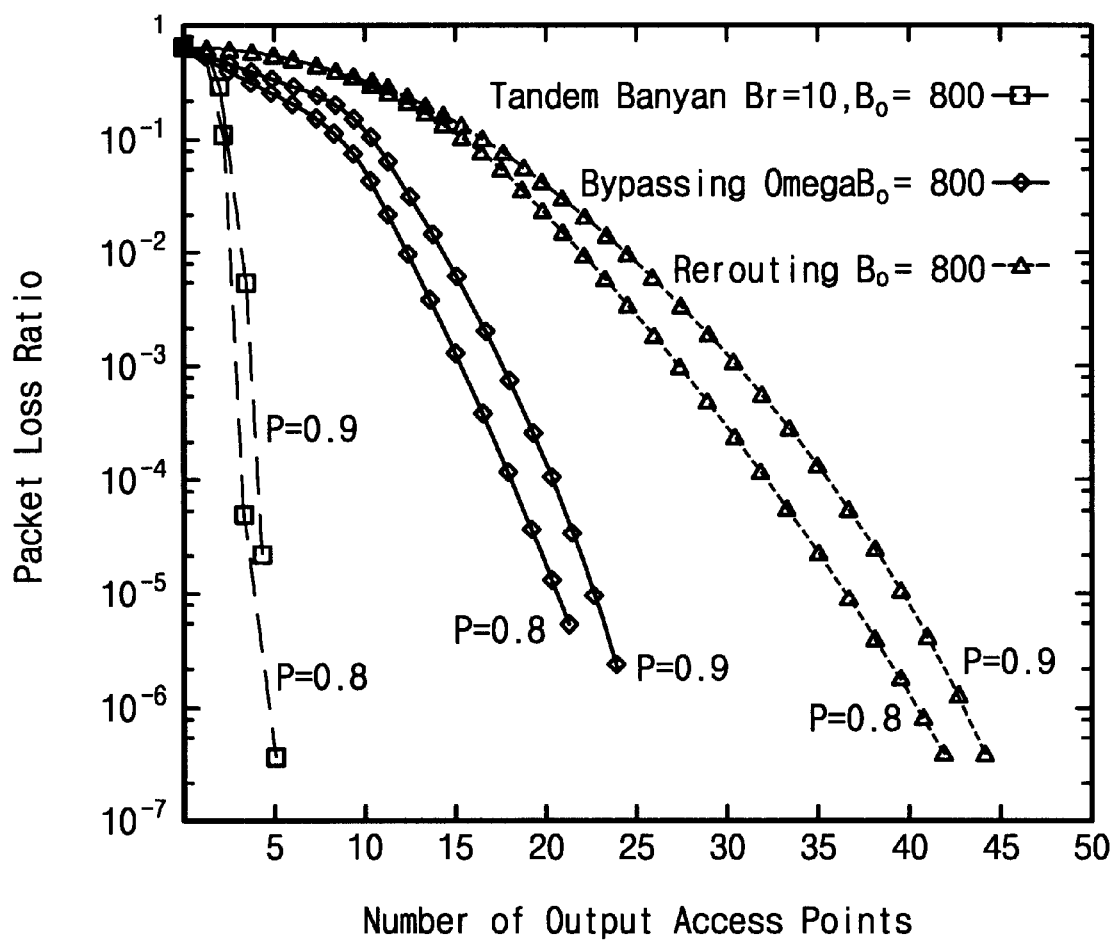
FIG. 21A is a graph showing the packet loss ratio with respect to the number of output access points when the input traffic rate is varying and size $B_s$ of the tail-spared buffer is 1.

FIG. 21A is a graph showing the packet loss ratio with respect to the number of output access points when the input traffic rate is varying and the size $B_s$ of the tail-spared buffer is 1. In FIG. 21A, the bypassing omega network of the present invention does not have the internal storing elements and uses the output buffering scheme. The packet loss ratio more rapidly decreases in the bypassing omega network of the present invention, represented by the sold line and circles, than in the rerouting network of the prior art represented by the dotted line and triangles. Also, the difference in the packet loss ratio when the input load decreases, i.e. when P=0.8, more rapidly decreases in the bypassing omega network of the present invention than in the rerouting network of the prior art. But the required number of output access points is smallest for a tandem banyan network with a recirculation buffer, $B_r=10$, represented by a dashed line and squares.

Figure 21B:
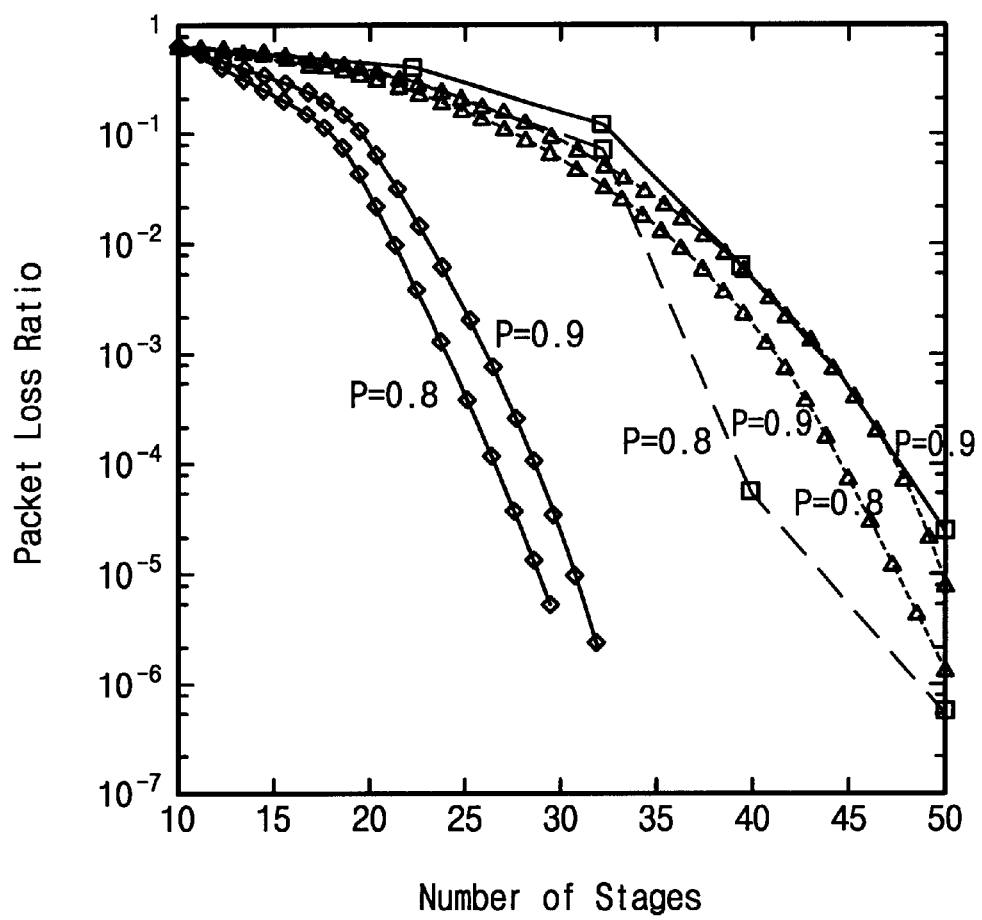
FIG. 21B is a graph showing the packet loss ratio with respect to the total number of stage when the input traffic rate is varying.

FIG. 21B shows the packet loss ratio with respect to the total number of stages when the input traffic rate is varying. In other words. FIG. 21B shows the total number of stages for each type of network at the same packet loss ratio. From FIGS. 21A and 21B, the tandem banyan network of the prior art requires the smallest number of output access points but requires a larger number of stages. The rerouting network of the prior art requires the largest number of output access points and a large number of total stages. And the bypassing omega network of the present invention requires a lesser number of output access points and lesser number of stages than the two prior art networks.

For the simulation illustrated in FIGS. 21A and 21B, a Bernoulli traffic source was used which has traffic with destinations that are uniformly distributed among the output ports. The size of the packet switch system used in this case is 1024×1024.

Figure 22A:
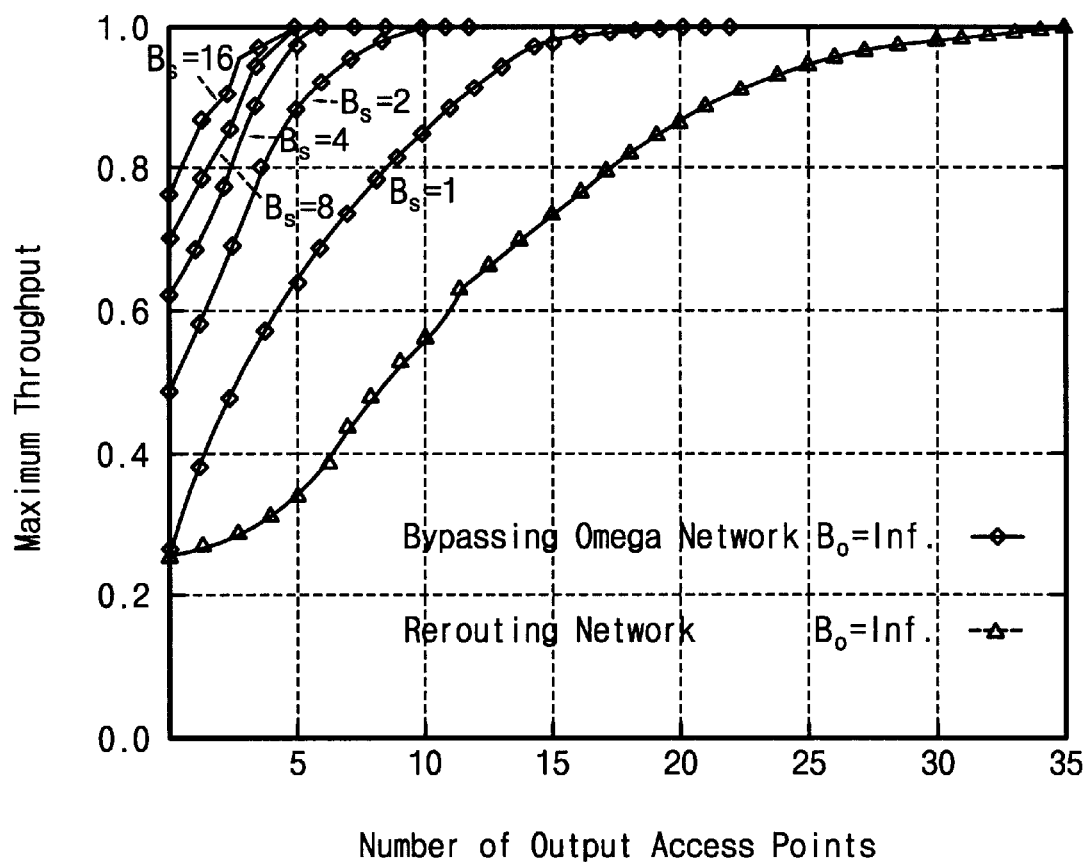
FIG. 22A is a graph showing the packet loss ratio of the output buffering packet switch system with respect to the number of output access points having Bernoulli traffic source which is uniformly-destined to each output port.

FIG. 22A shows the packet loss ratio for the output buffering packet switch system with respect to the number of output access points under uniformly distributed Bernoulli traffic. From FIG. 22A, the maximum throughput versus the number of output access points is shown. When $B_s$ is 1, the maximum throughput goes to 1 when the number of output access points is 18 for the switching system of the present invention, whereas 33 output access points are required to obtain the same throughput for the rerouting network of the prior art. When the depth of the tail-spared buffer, $B_s$, at each switching element increases, the maximum throughput reaches 1 even more rapidly in the bypassing omega system of the present invention.

The maximum incremental improvement is obtained by increasing $B_s$ from 1 to 2. When $B_s$ is 1, then the proposed system does not have internal buffering because the tail-spared buffer always empties the buffer space in anticipation of the packet which may arrive in the next time-slot. From FIG. 22A, it can be seen that the number of stages can be greatly reduced when the bypassing omega network of the present invention is adopted even though the $B_s$ is 1. But the number of stages can be reduced much more by introducing internal buffering.

Figure 22B:
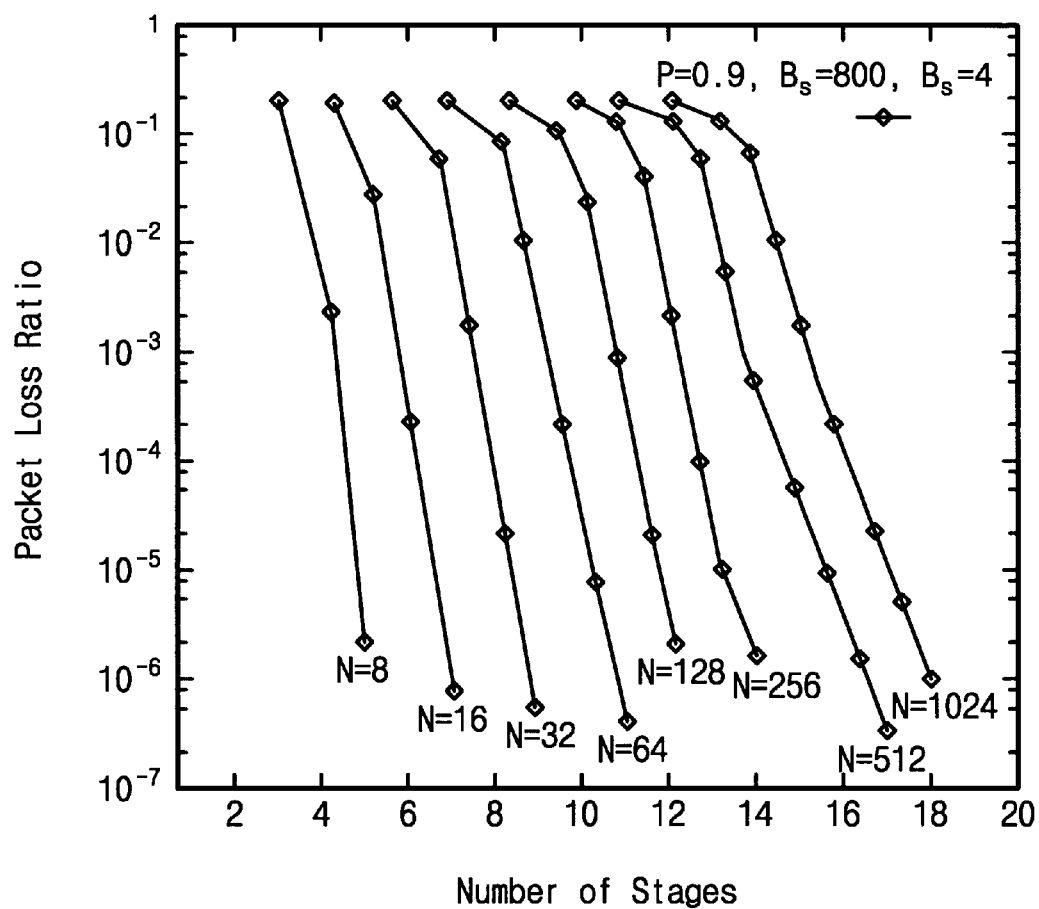
FIG. 22B is a graph showing the packet loss ratio of the output buffering packet switch system with respect to the total number of stages having Bernoulli traffic source which is uniformly-destined to each output port.

FIG. 22B shows the packet loss ratio of the output buffering packet switch system with respect to the total number of stages N given Bernoulli traffic. From FIG. 22B, as N increases, the starting number of total stages is increased and the packet loss ratio also increases. This increment of required stages to get the same performance is intuitively correct because more internal collisions occur as N increases.

Figure 22C:
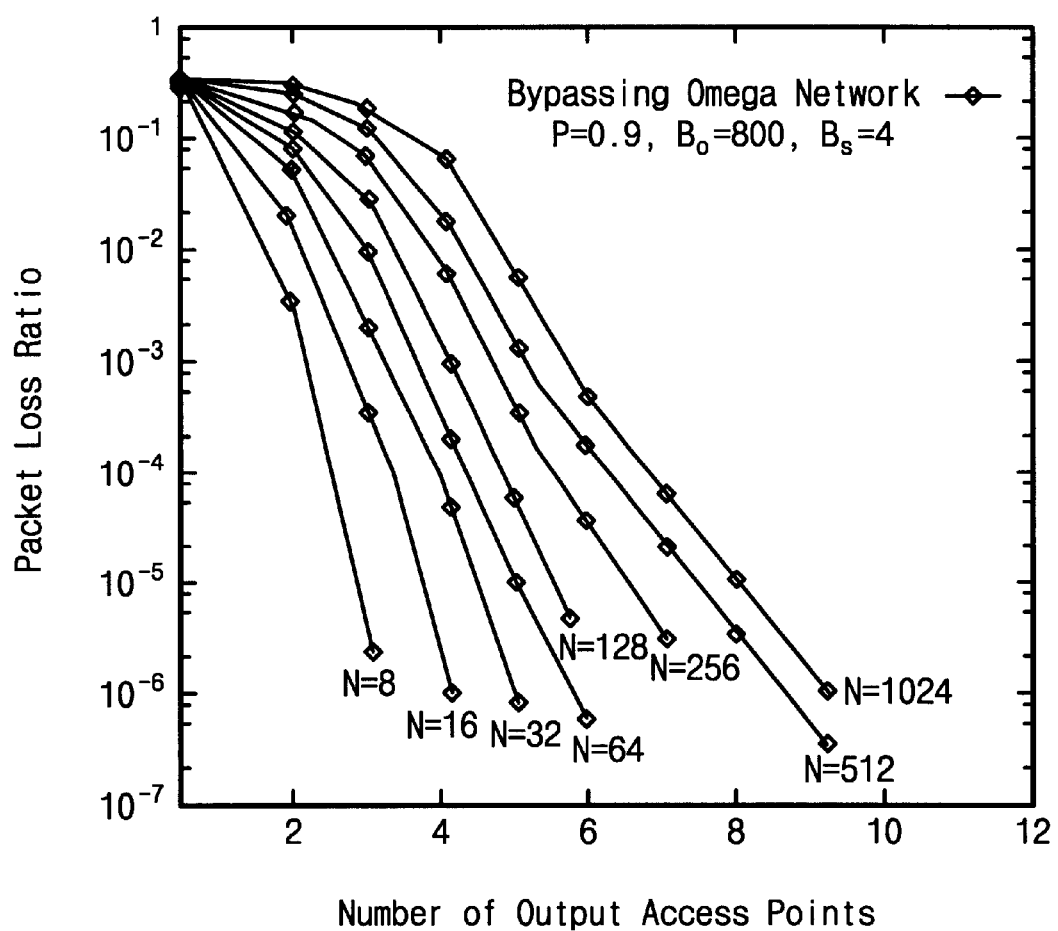
FIG. 22C is a graph showing the packet loss ratio of the output buffering packet switch system with respect to the number of output access points having Bernoulli traffic source which is uniformly-destined to each output port.

When the x-axis of the graph shown FIG. 22B is converted into the number of output access points, FIG. 22C is obtained. FIG. 22C shows the packet loss ratio of the output buffering packet switch system with respect to the number of output access points given Bernoulli traffic. As N increases, the starting number of total stages is increased, as can be more accurately seen from FIG. 22C.

Figure 22D:
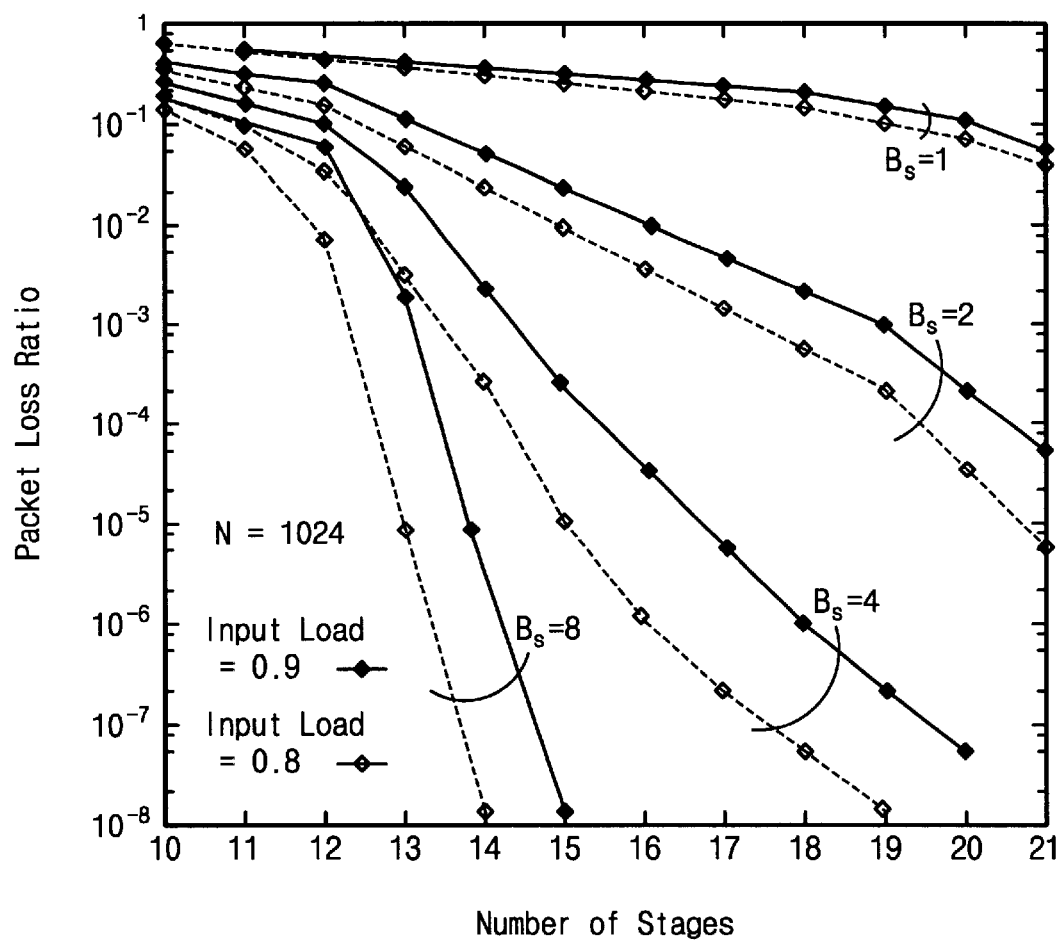
FIG. 22D is a graph showing the packet loss ratio of the output buffering packet switch system with respect to the number of output access points having Bernoulli traffic source which is uniformly-destined to each output port when $B_s$ is varying.

FIG. 22D shows the packet loss ratio of the output buffering packet switch system with respect to the number of output access points, given Bernoulli traffic, when $B_s$ is varied. From FIG. 22D, in a 1024, 1024 bypassing omega switch system consisting of 15 stages, when each buffer size $B_s$ is 8, the output buffer size is 800 and the input traffic rate is 0.9, the packet loss ratio of about $10^{-8}$ is obtained. This illustrates that the bypassing omega system of the present invention is remarkably different from the rerouting network of the prior art which requires a stage number of about 55 to obtain the same packet loss ratio as that of the bypassing omega system.

Figure 23A:
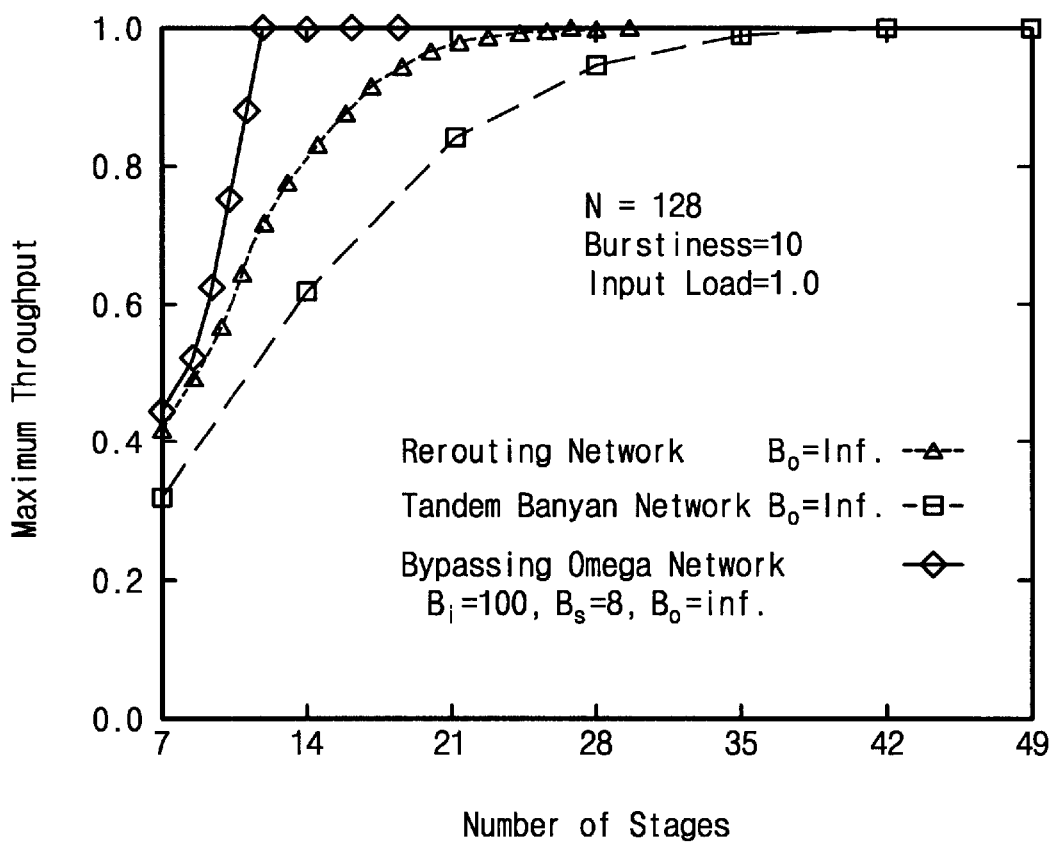
FIG. 23A is a graph showing the maximum throughput of the input/output buffering packet switch system with respect to the number of stages.
Figure 23B:
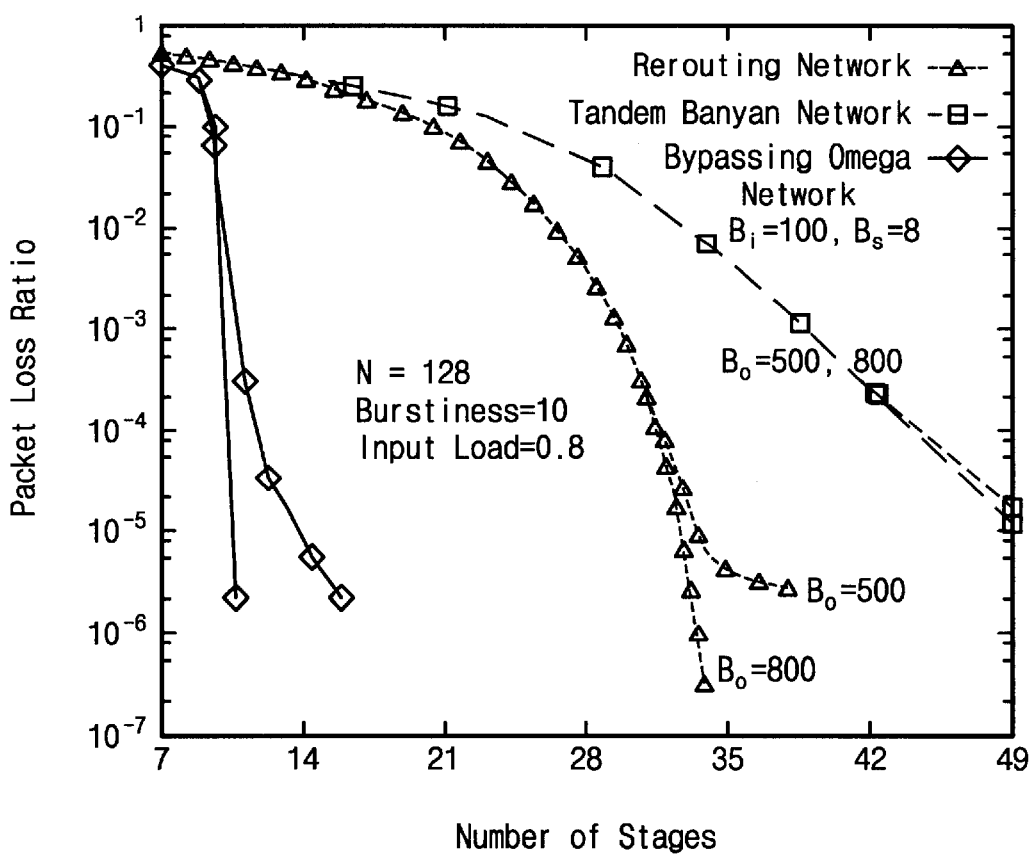
FIG. 23B is a graph showing the packet loss ratio of the input/output buffering packet switch system with respect to the number of stages.
Figure 23C:
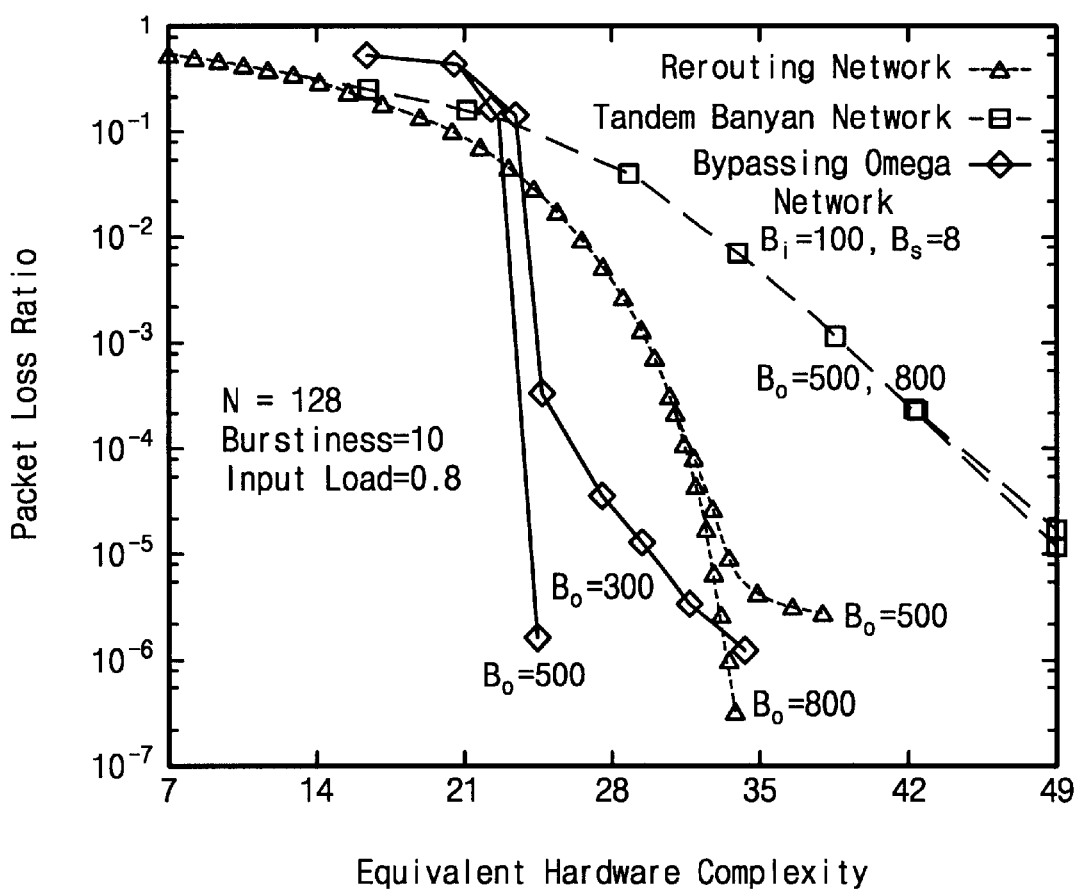
FIG. 23C is a graph showing the packet loss ratio of the input/output buffering packet switch system with respect to the equivalent hardware complexity.

For the simulation of FIGS. 23A–C, a binary traffic source with a burstiness level of 10 was used. The same traffic source was applied to each modeled switching system for purposes of performance comparison.

FIG. 23A shows the maximum throughput of the proposed network architecture when the system size N is equal to 128, the input buffer size $B_i$ is equal to 100, the output buffer size $B_O$ is unlimited, and the input buffer size of each switching element is equal to 8. Comparison was made with prior art systems. It can be seen from FIG. 23A that the bypassing omega network system requires significantly fewer stages, as compared with the prior art systems, for the same throughput.

FIG. 23B shows the packet loss ratio with respect to the number of stages when the input traffic load is 0.8 and the output buffer size $B_O$ is varied. The packet loss ratio of the proposed network is greatly reduced by increasing the output buffer size when the number of stages is greater than or equal to 10. But, in the rerouting network and tandem banyan network of the prior art, increasing the output buffer size barely contributes to lowering the packet loss ratio until the number of stages exceeds 32.

There are two main reasons for packet loss, one is routing path insufficiency in the switching fabric and the other is buffer over-flow. In FIG. 23B, the packet loss ratio of the prior art rerouting network saturates when the number of stages exceeds 32 and the output buffer size $B_O$ is 500 because the output buffer overflows due to the bursty traffic. But in the prior art rerouting network, the packet loss ratio also suffers from the insufficiency of the routing path in the switching fabric until the number of stages exceeds 32. In FIG. 23B, a packet loss ratio of $10^{-6}$ can be obtained with only 11 stages for the system of the present invention when the output buffer size $B_O$ is 500, the input buffer size $B_i$ is 100, and the input buffer size $B_s$ of each switching element is equal to 8.

FIG. 23C shows the packet loss ratio with respect to equivalent hardware complexity. While the basic switching element of the rerouting network is similar to that of the tandem banyan network which performs 2×2 switching except that, the basic switching element of the bypassing omega network of the present invention does 3×3 switching. The hardware complexity of each basic switching element can be represented in a simple form by multiplying the number of input ports by the number of output ports of the basic switching element. FIG. 23C was obtained from FIG. 23B by scaling the number of stages with the ratio of basic switching element hardware complexity, given by (3×3)/(2×2)=2.25. It can be seen from FIG. 23C that the hardware complexity of the bypassing omega network system of the present invention is still lower than that of the prior art systems for a reasonable level of system performance in the region where the packet loss ratio is less than $10^{-3}$.

As described above, a bypassing omega network according to the present invention has multiple-output access points in order that a plurality of packets can arrive at a destination port.

Also, the total number of connections in the bypassing omega network system of the present invention is less than that of the rerouting network and tandem banyan network of the prior art because the number of stages required in the proposed system is greatly reduced as compared with that of other systems.

Moreover, the proposed system has such a highly regular connection scheme that enables high fault tolerance and easy maintenance.

Having illustrated and described the principles of the present invention in the context of the embodiments described above, it should be readily apparent to those skilled in the art that the invention can be modified in arrangement and detail without departing from such principles.

What is claimed is:

1. A multi-stage (NXN) interconnection network having N input ports and N output ports, for transmitting packets from the input ports to the output ports, comprising:

a multi-stage packet switching network having at least $\log_M N$ switching stages; and each of the switching stages having N/2 MXM switching elements, where M is the number of input or output ports of each switching element, wherein each switching element at each stage comprises X bypassing input ports, M−X input routing ports, X bypassing output ports and M−X output routing ports, where X is an integer greater than 0, and wherein each of the bypassing output ports of each switching element at each stage are connected to a corresponding bypassing input port of a corresponding switching element disposed in a same position of a next stage, and each of the output routing ports of each switching element at each stage are connected to one of the input routing ports of one of the switching elements of the next stage by means of a perfect shuffle connection scheme.

2. The multi-stage interconnection network as defined in claim 1, wherein each of said packets comprises a first information field indicative of a routed number of the packet in the network and a second information field indicative of a stayed time in the network.

3. The multi-stage interconnection network as defined in claim 2, wherein each of said switching elements increments the first information field of at least one packet.

4. The multi-stage interconnection network as defined in claim 3, further comprising means for generating information indicative of a minimal routing number related to each switching stage and supplying the information to the switching elements at each stage.

5. The multi-stage interconnection network as defined in claim 4, wherein each of said switching elements permits one packet having a greater value in one of the first and second information fields than another packet to be transmitted to the output routing port indicated by a destination address of the one packet.

6. The multi-stage interconnection network as defined in claim 1, wherein said multi-stage packet switching network includes $S_{total}$−$\log_M N$+1 output access points, where $S_{total}$ is the number of the switching stages.

7. A packet switch system comprising:

an input module for receiving an original packet from a terminal and converting the original packet into a switching packet by adding to the original packet an information field related to routing;

a multi-stage packet switching network for performing the routing of the switching packet, said network having at least $\log_M N$ switching stages and each switching stage having N/2 MXM switching elements, where M is the number of input or output ports of each switching element;

logic circuitry for generating a minimal routing number related to each switching stage and supplying the minimal routing number to the switching elements of each stage; and an output module for receiving the switching packet from the multistage packet switching network and converting the switching packet into the original packet by removing the information field from the switching packet;

wherein each switching element at each stage comprises X bypassing input ports, M−X input routing ports, X bypassing output ports and M−X output routing ports, where X is an integer greater than 0, wherein each bypassing output port of each switching element at each stage is connected to a bypassing input port of a switching element disposed in a corresponding position in the next stage, wherein the output routing ports of each switching element at each stage are connected to the input routing ports of each of the switching elements at the next stage of the network by means of a perfect shuffle connection scheme, and wherein the input routing ports of each switching element at a first stage are connected to the input module.

8. The packet switch system as defined in claim 7, wherein each of the switching elements includes a FIFO buffer for storing a received switching packet.

9. The packet switch system as defined in claim 7, wherein the switching element and the output module are each configured to generate a back-pressuring signal to a switching element disposed at an immediately preceding stage of the network.

10. The packet switch system as defined in claim 7, wherein the output module includes a buffer for storing a switching packet received by the output module.

11. The packet switch system as defined in claim 10, wherein the input module includes a buffer for storing an original switching packet received by the input module.

12. A method for switching packets in a NXN multi-stage interconnection network, the method comprising:

providing a plurality of MXM switching elements, where each switching element has M routing input ports, M routing output ports, a bypass input port and a bypass output port;

organizing the plurality of MXM switching elements into $\log_M N$ stages;

connecting each of the routing input ports of the switching elements in a first stage of the $\log_M N$ stages to one of the N input ports of the NXN network;

connecting each of the routing output ports of the switching elements in a last stage of the $\log_M N$ stages to one of the N input ports of the NXN network;

interconnecting the $\log_M N$ stages through a perfect shuffle interconnection scheme of the routing input ports and routing output ports of the switching elements in adjacent stages; and interconnecting the bypass output port of each switching element to the bypass input port of a corresponding switching element in the adjacent stage.

13. The method of claim 12, further including:

providing each of the packets with a routed number field and an elapsed time field;

incrementing the routed number field of each packet when the packet is routed through one of the switching elements; and routing a packet having the highest value for one of the routed number field and the elapsed time field to the routing output port indicated by a destination field of the packet.

14. The method of claim 13, further including:

generating a minimum routing number for each stage of the network;

inputting the minimum routing number for each stage into each switching element in the stage; and discarding each packet received by one of the switching elements where the value of the routed number field of the packet is less than the minimum routing number input to the switching element.

15. The method of claim 12, further including:

bypassing a first packet to the bypass output port of a given switching element in the event of a conflict between the first packet and a second packet for a given one of the routing output ports of the given switching element.

16. The method of claim 15, further including:

deflecting a third packet to another one of the routing output ports of the given switching element in the event of a conflict between the first, second and third packets for the given one of the routing output ports of the given switching element.

17. The method of claim 13, further including:

coupling output access points between each of the N output ports and the output routing ports of the switching elements of those stages having a stage number that is greater than or equal to the number of routing bits in the destination field of the packets; and discarding packets received by switching elements where the value of the routed number field equals the number of routing bits in the destination field of the packet.

18. The method of claim 12, further including:

buffering packets at each of the N output ports.

19. The method of claim 12, further including:

buffering packets at each of N input ports.

20. The method of claim 12, further including:

buffering packets in each one of the switching elements.

21. The method of claim 20, further including:

coupling a backpressure signal from each one of the routing input ports and bypass input port of each switching element in a given switching stage to the corresponding one of the routing output ports and the bypass output port of switching elements in a preceding stage;

activating the backpressure signal for one of the routing input ports and bypass input port when a buffer corresponding to the port is full; and delaying transmission of a packet from the corresponding one of the routing output ports and the bypass output port of switching elements in a preceding stage responsive to the activation of the backpressure signal.

* * * * *